US011665101B2

(12) United States Patent
Li et al.

(10) Patent No.: US 11,665,101 B2
(45) Date of Patent: May 30, 2023

(54) CONTENTION WINDOW SIZE DETERMINING METHOD AND APPARATUS

(71) Applicant: HUAWEI TECHNOLOGIES CO., LTD., Guangdong (CN)

(72) Inventors: Yuan Li, Bonn (DE); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 16/992,286

(22) Filed: Aug. 13, 2020

(65) Prior Publication Data

US 2020/0374236 A1  Nov. 26, 2020

Related U.S. Application Data

(63) Continuation of application No. PCT/CN2019/074700, filed on Feb. 3, 2019.

(30) Foreign Application Priority Data

Feb. 14, 2018 (CN) .......................... 201810151352.5

(51) Int. Cl.
*H04L 47/27* (2022.01)
*H04W 72/0453* (2023.01)
(52) U.S. Cl.
CPC ......... *H04L 47/27* (2013.01); *H04W 72/0453* (2013.01)

(58) Field of Classification Search
CPC ..... H04L 47/27; H04L 1/1861; H04L 1/1614; H04L 1/16; H04L 1/18; H04L 1/189;
(Continued)

(56) References Cited

U.S. PATENT DOCUMENTS 9,826,555 B2   11/2017 Cheng et al.
2016/0345326 A1* 11/2016 Yerramalli ............ H04W 76/28
(Continued)

FOREIGN PATENT DOCUMENTS

CN   106304386 A   1/2017
CN   106656430 A   5/2017
(Continued)

OTHER PUBLICATIONS

62540525,Specification (Year: 2017).*
(Continued)

*Primary Examiner* — Yu-Wen Chang
(74) *Attorney, Agent, or Firm* — Fish & Richardson P.C.

(57) ABSTRACT

Embodiments of this disclosure provide a contention window size determining method and apparatus, and relate to the communications field. One method includes: sending, by a first device, one or more data packets to one or more second devices during a reference time unit, wherein the one or more data packets occupy a first subband; receiving, by the first device from the one more second devices, one or more hybrid automatic repeat request-acknowledgements (HARQ-ACKs) corresponding to the one or more data packets; and determining, by the first device, a contention window size of the first subband based on the one or more HARQ-ACKs.

16 Claims, 13 Drawing Sheets

(58) Field of Classification Search
CPC ..... H04L 5/001; H04L 5/0055; H04L 5/0007; H04L 5/0094; H04L 1/1607; H04L 1/1812; H04W 72/0453; H04W 74/0808; H04W 72/0413; H04W 72/042; H04W 72/085

See application file for complete search history.

(56) References Cited

U.S. PATENT DOCUMENTS

| | | | |
|---|---|---|---|
| 2017/0019909 A1* | 1/2017 | Si | H04W 76/28 |
| 2017/0086225 A1 | 3/2017 | Ljung | |
| 2018/0020408 A1 | 1/2018 | Zhang et al. | |
| 2018/0254858 A1* | 9/2018 | He | H04L 1/0001 |
| 2019/0141734 A1* | 5/2019 | Lei | H04W 72/0453 |
| 2019/0150122 A1* | 5/2019 | Ying | H04W 72/14 370/329 |
| 2019/0182865 A1* | 6/2019 | Falahati | H04W 74/004 |
| 2019/0246412 A1* | 8/2019 | Noh | H04L 5/14 |
| 2020/0236709 A1* | 7/2020 | Park | H04L 5/00 |
| 2020/0259621 A1* | 8/2020 | Oh | H04W 72/1289 |
| 2020/0305184 A1* | 9/2020 | Kim | H04L 5/0053 |
| 2020/0314906 A1* | 10/2020 | Goyal | H04B 7/0695 |
| 2020/0344819 A1* | 10/2020 | Myung | H04W 72/0453 |
| 2020/0374045 A1* | 11/2020 | Yin | H04W 72/042 |
| 2020/0374933 A1* | 11/2020 | Lou | H04W 74/0808 |
| 2020/0383110 A1* | 12/2020 | Kusashima | H04W 72/0446 |
| 2021/0067276 A1* | 3/2021 | Wang | H04W 72/0413 |
| 2021/0307068 A1* | 9/2021 | Kim | H04B 7/0617 |

FOREIGN PATENT DOCUMENTS

| | | |
|---|---|---|
| CN | 107580801 A | 1/2018 |
| KR | 20170020238 A | 2/2017 |
| KR | 20170039154 A | 4/2017 |
| KR | 20170139058 A | 12/2017 |
| WO | 2016182355 A1 | 11/2016 |
| WO | 2016182398 A1 | 11/2016 |
| WO | 2017004256 A1 | 1/2017 |
| WO | 2017026937 A1 | 2/2017 |
| WO | 2017045105 A1 | 3/2017 |
| WO | 2017069798 A1 | 4/2017 |
| WO | 2017213393 A1 | 12/2017 |
| WO | 2020146607 A1 | 7/2020 |

OTHER PUBLICATIONS

62586799,Specification (Year: 2017).*
62586799,Drawings (Year: 2017).*
3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.
PCT International Search Report and Written Opinion issued in International Application No. PCT/CN2019/074700 dated Apr. 16, 2019, 19 pages (with English translation).
Office Action issued in Japanese Application No. 2020-565004 dated Sep. 28, 2021, 8 pages (with English translation).
Office Action issued in Chinese Application No. 202011550075.9 dated Sep. 22, 2021, 7 pages.
Extended European Search Report issued in European Application No. 19753886.1 dated Feb. 9, 2021, 9 pages.
Huawei et al., "Triggering mechanism for contention window size adaptation," 3GPP TSG RAN WG1 Meeting #82, R1-153782, Beijing, China, Aug. 24-28, 2015, 4 pages.
Office Action issued in Korean Application No. 2020-7023883 dated Jul. 5, 2021, 10 pages (with English translation).
Office Action issued in Korean Application No. 2020-7023883 dated Jan. 11, 2022, 4 pages (with English translation).
Office Action issued in Indian Application No. 202027031393 dated Dec. 20, 2021, 6 pages.
Office Action in Chinese Appln. No. 201810151352.5, dated Feb. 23, 2023, 9 pages.

* cited by examiner

CONTENTION WINDOW SIZE DETERMINING METHOD AND APPARATUS

CROSS-REFERENCE TO RELATED DISCLOSURES

This disclosure is a continuation of International Application No. PCT/CN2019/074700, filed on Feb. 3, 2019, which claims priority to Chinese Patent Application No. 201810151352.5, filed on Feb. 14, 2018. The disclosures of the aforementioned applications are hereby incorporated by reference in their entireties.

TECHNICAL FIELD

Embodiments of this disclosure relate to the communications field, and more specifically, to a contention window size determining method and apparatus.

BACKGROUND

In a wireless communications network, devices need to use a frequency resource to transmit information. The frequency resource is also referred to as a spectrum or a frequency band. The frequency band may include an authorized frequency band and an unauthorized frequency band. The unauthorized frequency band is also referred to as an unlicensed frequency band. The authorized frequency band is a dedicated frequency resource of some operators. The unlicensed frequency band is a common frequency resource in the wireless communications network, and may be used free of charge. Different devices may share a frequency resource on the unlicensed frequency band. With development of communications technologies, an increasing amount of information is transmitted on the wireless communications network. Transmitting information by using the unlicensed frequency band can improve a data throughput in the wireless communications network and better meet user requirements.

In a future communications system such as the 5th generation (5G) communications system and a new radio (NR)-based communications system, data communication may be performed by using an unlicensed frequency band resource. A resource contention method for the unlicensed frequency band resource includes a listen before talk (LBT, or referred to as channel listening) rule. Based on the foregoing background, how to design a proper mechanism for determining a contention window (CW) size for a wideband NR system operating on the unlicensed frequency band, to achieve efficient access to a channel and friendly coexistence with surrounding contention nodes is a problem to be resolved in this disclosure.

SUMMARY

Embodiments of this disclosure provide a contention window size determining method and apparatus.

According to a first aspect, an embodiment of this disclosure provides a contention window size determining method, including: sending, by a first device, one or more data packets to one or more second devices on a reference time unit, where the one or more data packets occupy a first subband; receiving, by the first device, one or more hybrid automatic repeat request-acknowledgements HARQ-ACKs that are fed back by the one or more second devices and that correspond to the one or more data packets; and determining, by the first device, a contention window size of the first subband based on the one or more HARQ-ACKs.

According to the method provided in this embodiment of this disclosure, efficient access to a channel and friendly coexistence with surrounding contention nodes can be implemented, and notification signaling overheads are reduced.

Optionally, the first device is an access network device, and the second device is a terminal device. For example, during downlink transmission, the first device sends one or more downlink data packets to the one or more second devices on the reference time unit.

Optionally, the first device is a terminal device, and the second device is an access network device. For example, during uplink transmission, the first device sends one or more uplink data packets to the one second device on the reference time unit.

Optionally, during downlink transmission, the first device sends the one or more data packets to the one or more second devices. The first device sends at least one data packet to any one of the one or more second devices. Therefore, the one or more data packets include at least one data packet that is sent by the first device to all of the one or more second devices on the reference time unit.

Optionally, during uplink transmission, the first device sends the one or more data packets to the one second device.

Optionally, the one or more data packets are one data packet, including but not limited to a first data packet, a second data packet, or a third data packet described below.

In a possible implementation, the determining, by the first device, a contention window size of the first subband based on the one or more HARQ-ACKs includes: determining the contention window size of the first subband based on one or more HARQ states for the first subband that correspond to the one or more data packets, where the contention window size of the first subband is determined based on one of the following information: a proportion of a NACK in the one or more HARQ states for the first subband that correspond to the one or more data packets; or a proportion of an ACK in the one or more HARQ states for the first subband that correspond to the one or more data packets; or a quantity of NACKs in the one or more HARQ states for the first subband that correspond to the one or more data packets; or a quantity of ACKs in the one or more HARQ states for the first subband, that correspond to the one or more data packets; or whether a HARQ state, for the first subband, that corresponds to the one data packet is a NACK; or whether a HARQ state, for the first subband, that corresponds to the one data packet is an ACK, where the one or more HARQ states for the first subband that correspond to the one or more data packets are represented by the one or more HARQ-ACKs.

Each of the one or more data packets has one HARQ state for the first subband (each HARQ state may be an ACK or a NACK). Therefore, the one or more data packets have one or more HARQ states for the first subband, namely, a HARQ state set, for the first subband, that corresponds to the one or more data packets. The proportion of a NACK is a proportion of a NACK in the HARQ state set, for the first subband, that corresponds to the one or more data packets. For example, when the one or more data packets are m. (m is a positive integer) data packets, HARQ states for the first subband that correspond to the m data packets are in HARQ states, the m HARQ states one-to-one correspond to the m data packets, and the proportion of a NACK is a proportion of a NACK state to the m HARQ states.

Similarly, the proportion of an ACK in the one or more HARQ states for the first subband that correspond to the one or more data packets is a proportion of an ACK in the HARQ state set, for the first subband, that corresponds to the one or more data packets. The quantity of NACKs/ACKs in the one or more HARQ states for the first subband that correspond to the one or more data packets is a quantity of NACKs/ACKs in the HARQ state set, for the first subband, that corresponds to the one or more data packets.

The foregoing description is also applicable to a proportion of a NACK/an ACK to a HARQ state, for a second subband, that corresponds to a data packet in a first data packet set, a quantity of NACKs/ACKs in the HARQ state, a proportion of a NACK/an ACK to a HARQ state, for a third subband, that corresponds to a data packet in a second data packet set, a quantity of NACKs/ACKs in the HARQ state, a proportion of a NACK/an ACK to a HARQ state, for a fourth subband, that corresponds to a data packet in a third data packet set, and a quantity of NACKs/ACKs in the HARQ state.

Optionally, the one or more HARQ states for the first subband that correspond to the one or more data packets are represented by the one or more HARQ-ACKs. This means that the first device obtains, based on or with reference to the one or more received HARQ-ACKs, the one or more HARQ states for the first subband. Specifically, the first device converts the one or more HARQ-ACKs into the one or more HARQ states for the first subband, to determine the contention window size of the first subband. For example, for any one of the one or more data packets, the first device converts or translates a HARQ-ACK corresponding to the any data packet into a HARQ state, for the first subband, that corresponds to the any data packet.

Optionally, the one or more HARQ states for the first subband that correspond to the one or more data packets are represented by the one or more HARQ-ACKs. This means that for any one of the one or more data packets, a HARQ state, for the first subband, that corresponds to the any data packet is a HARQ-ACK corresponding to the any data packet. In other words, after receiving the HARQ-ACK corresponding to the any data packet, the first device directly determines the contention window size of the first subband based on the HARQ-ACK corresponding to the any data packet.

The foregoing description of the one or more HARQ states for the first subband that correspond to the one or more data packets is also applicable to a HARQ state, for a subband (the second subband, the third subband, or the fourth subband), that corresponds to a data packet in a data packet set (the first data packet set, the second data packet set, or the third data packet set).

Optionally, any one of the one or more data packets may correspond to one HARQ-ACK included in the one or more HARQ-ACKs. For example, a HARQ-ACK received by the first device for the any data packet is a TB HARQ-ACK, and the any data packet corresponds to the TB HARQ-ACK.

Optionally, any one of the one or more data packets corresponds to a plurality of HARQ-ACKs in the one or more HARQ-ACKs. For example, a HARQ-ACK received by the first device for the any data packet is a CBG HARQ-ACK, and the any data packet corresponds to one or more CBG HARQ-ACKs.

The foregoing description that any one of the one or more data packets corresponds to one HARQ-ACK or a plurality of HARQ-ACKs is also applicable to any data packet in a data packet set (the first data packet set, the second data packet set, or the third data packet set) and one or more HARQ-ACKs corresponding to the data packet.

Further, the one or more data packets include all data packets that are sent by the first device on the reference time unit and that occupy the first subband.

Optionally, the contention window size of the first subband is determined based on the one or more HARQ states for the first subband that correspond to the one or more data packets, or the contention window size of the first subband may be determined based on whether there is at least one ACK in the HARQ states for the first subband that correspond to the one or more data packets, or whether there is at least one NACK in the HARQ states for the first subband that correspond to the one or more data packets.

In a possible implementation, the one or more data packets include a first data packet, the first data packet is carried on a plurality of subbands including the first subband, and the one or more HARQ-ACKs include a TB HARQ-ACK for a transport block TB corresponding to the first data packet. When the TB HARQ-ACK is an ACK, a HARQ state, for the first subband, that corresponds to the first data packet is an ACK; or when the TB HARQ-ACK is a NACK, a HARQ state, for the first subband, that corresponds to the first data packet is a NACK.

Specifically, the TB HARQ-ACK is a HARQ-ACK.

Optionally, the one or more HARQ states for the first subband that correspond to the one or more data packets include the HARQ state, for the first subband, that corresponds to the first data packet.

In a possible implementation, the plurality of subbands further include a second subband, and the first device further determines a contention window size of the second subband based on the TB HARQ-ACK.

According to the method provided in this embodiment of this disclosure, a CWS of a subband can be accurately adjusted without increasing HARQ-ACK feedback overheads, to implement friendly coexistence with an adjacent node that operates on a same unlicensed spectrum.

According to the method provided in this embodiment of this disclosure, when a wideband data packet occupies a plurality of subbands, a sending node repeatedly uses a HARQ-ACK corresponding to the wideband data packet to adjust a CWS of each subband.

In a possible implementation, that the first device further determines a contention window size of the second subband based on the TB HARQ-ACK includes: determining, by the first device, the contention window size of the second subband based on a HARQ state, for the second subband, that corresponds to the first data packet, where when the TB HARQ-ACK is an ACK, the HARQ state, for the second subband, that corresponds to the first data packet is an ACK; or when the TB HARQ-ACK is a NACK, the HARQ state, for the second subband, that corresponds to the first data packet is a NACK.

In a possible implementation, the determining, by the first device, the contention window size of the second subband based on a HARQ state, for the second subband, that corresponds to the first data packet includes: determining, by the first device, the contention window size of the second subband based on a HARQ state, for the second subband, that corresponds to a data packet in the first data packet set, where the first data packet set includes at least one data packet that is sent by the first device on the reference time unit and that occupies the second subband, and the first data packet set includes the first data packet. The contention window size of the second subband is determined based on one of the following information: a proportion of a NACK to the HARQ state, for the second subband, that corresponds to the data packet in the first data packet set; or a proportion of an ACK to the HARQ state, for the second subband, that corresponds to the data packet in the first data packet set; or a quantity of NACKs in the HARQ state, for the second subband, that corresponds to the data packet in the first data packet set; or a quantity of ACKs in the HARQ state, for the second subband, that corresponds to the data packet in the first data packet set; or whether the HARQ state, for the second subband, that corresponds to the data packet in the first data packet set is a NACK; or whether the HARQ state, for the second subband, that corresponds to the data packet in the first data packet set is an ACK. The HARQ state, for the second subband, that corresponds to the data packet in the first data packet set is represented by one or more HARQ-ACKs corresponding to the data packet in the first data packet set.

Further, the data packet in the first data packet set is all data packets in the first data packet set.

Further, the first data packet set includes all data packets that are sent by the first device on the reference time unit and that occupy the second subband.

Specifically, the data packet in the first data packet set includes a data packet sent by the first device to one or more receiving devices. This is similar to that the first device sends the one or more data packets to the one or more second devices.

Specifically, the one or more HARQ-ACKs corresponding to the data packet in the first data packet set are one or more HARQ-ACKs fed back by the one or more receiving devices, and are similar to the one or more HARQ-ACKs that are fed back by the one or more second devices and that correspond to the one or more data packets described above. The one or more receiving devices and the one or more second devices may be a same set, or may be different sets.

It should be understood that a correspondence between a data packet in the first data packet set and a HARQ-ACK corresponding to the data packet in the first data packet set herein is similar to a correspondence between the one or more HARQ-ACKs and the one or more data packets: Any data packet in the first data packet set may correspond to one or more HARQ-ACKs.

Optionally, the HARQ state, for the second subband, that corresponds to the data packet in the first data packet set includes the HARQ state, for the second subband, that corresponds to the first data packet.

Optionally, the contention window size of the second subband is determined based on one or more HARQ states for the second subband that correspond to the one or more data packets, or the contention window size of the second subband may be determined based on whether there is at least one ACK in the one or more HARQ states for the second subband that correspond to the one or more data packets, or whether there is at least one HACK in the one or more HARQ states for the second subband that correspond to the one or more data packets.

In a possible implementation, the one or more data packets include the second data packet, the second data packet includes one or more code block groups CBGs, and the one or more HARQ-ACKs include one or more CBG HARQ-ACKs corresponding to the one or more code block groups. When the one or more CBG HARQ-ACKs are all ACKs, a HARQ state, for the first subband, that corresponds to the second data packet is an ACK; or when the one or more CBG HARQ-ACKs include one or more NACKs, a HARQ state, for the first subband, that corresponds to the second data packet is a NACK The second data packet includes the one or more code block groups. In other words, the one or more code block groups include all code block groups included in the second data packet.

Further, the one or more code block groups are a plurality of code block groups.

In a possible implementation, the second data packet is carried on at least the first subband and the third subband, and the first device further determines a contention window size of the third subband based on the one or more CBG HARQ-ACKs.

According to the method provided in this embodiment of this disclosure, a proportion of a NACK or an ACK obtained in a same case is consistent, to better implement friendly coexistence with a surrounding node.

In a possible implementation, that the first device further determines a contention window size of the third subband based on the one or more CBG HARQ-ACKs includes: further determining, by the first device, the contention window size of the third subband based on a HARQ state, for the third subband, that corresponds to the second data packet, where when the one or more CBG-acknowledgements are all ACKs, the HARQ state, for the third subband, that corresponds to the second data packet is an ACK; or when the one or more CBG-acknowledgements include one or more NACKs, the HARQ state, for the third subband, that corresponds to the second data packet is a NACK.

In a possible implementation, the further determining, by the first device, the contention window size of the third subband based on a HARQ state, for the third subband, that corresponds to the second data packet includes: determining, by the first device, the contention window size of the third subband based on a HARQ state, for the third subband, that corresponds to a data packet in the second data packet set, where the second data packet set includes at least one data packet that is sent by the first device on the reference time unit and that occupies the third subband, and the second data packet set includes the second data packet. The contention window size of the third subband is determined based on one of the following information: a proportion of a NACK to the HARQ state, for the third subband, that corresponds to the data packet in the second data packet set; or a proportion of an ACK to the HARQ state, for the third subband, that corresponds to the data packet in the second data packet set; or a quantity of NACKs in the HARQ state, for the third subband, that corresponds to the data packet in the second data packet set; or a quantity of ACKs in the HARQ state, for the third subband, that corresponds to the data packet in the second data packet set; or whether the HARQ state, for the third subband, that corresponds to the data packet in the second data packet set is a HACK; or whether the HARQ state, for the third subband, that corresponds to the data packet in the second data packet set is an ACK. The HARQ state, for the third subband, that corresponds to the data packet in the second data packet set is represented by one or more HARQ-ACKs corresponding to the data packet in the second data packet set.

Further, the data packet n the second data packet set is all data packets in the second data packet set.

Further, the second data packet set includes all data packets that are sent by the first device on the reference time unit and that occupy the third subband.

Specifically, the data packet in the second data packet set includes a data packet sent by the first device to one or more receiving devices. This is similar to that the first device sends the one or more data packets to the one or more second devices.

Specifically, the one or more HARQ-ACKs corresponding to the data packet in the second data packet set are one or more HARQ-ACKs fed back by the one or more receiving devices, and are similar to the one or more HARQ-ACKs that are fed back by the one or more second devices and that correspond to the one or more data packets. The one or more receiving devices and the one or more second devices may be a same set, or may be different sets.

It should be understood that a correspondence between a data packet in the second data packet set and a HARQ-ACK corresponding to the data packet in the second data packet set herein is similar to a correspondence between the one or more HARQ-ACKs and the one or more data packets. Any data packet in the second data packet set may correspond to one or more HARQ-ACKs.

Optionally, the one or more HARQ states for the first subband that correspond to the one or more data packets include the HARQ state, for the first subband, that corresponds to the second data packet.

Optionally, the HARQ state, for the third subband, that corresponds to the data packet in the second data packet set includes the HARQ state, for the third subband, that corresponds to the second data packet.

Optionally, the contention window size of the third subband is determined based on one or more HARQ states for the third subband that correspond to the one or more data packets, or the contention window size of the third subband may be determined based on whether there is at least one ACK in the one or more HARQ states for the third subband that correspond to the one or more data packets, or whether there is at least one NACK in the one or more HARQ states for the third subband that correspond to the one or more data packets.

In a possible implementation, the one or more data packets include the third data packet, the third data packet is carried on a plurality of subbands including the first subband, the third data packet includes a first code block group set, the first code block group set is consisted of one or more code block groups that occupy the first subband, and the one or more HARQ-ACKs include one or more CBG HARQ-ACKs corresponding to the one or more code block groups in the first code block group set. When the one or more CBG HARQ-ACKs corresponding to the one or more code block groups in the first code block group set are all ACKs, a HARQ state, for the first subband, that corresponds to the third data packet is an ACK; or when the one or more CBG HARQ-ACKs corresponding to the one or more code block groups in the first code block group set include one or more NACKs, a HARQ state, for the first subband, that corresponds to the third data packet is a NACK.

Specifically, that the first code block group set includes the one or more code block groups that occupy the first subband means that the first code block group set is a set including all code block groups that are in all code block groups included in the third data packet and that occupy the first subband.

Further, the first code block group set includes a plurality of code block groups.

Further, the one or more HARQ-ACKs include CBG HARQ-ACKs corresponding to all the code block groups in the first code block group set.

In a possible implementation, the first code block group set includes a first code block group, the first code block group occupies the first subband and a fourth subband, the third data packet further includes a second code block group set, the second code block group set is consisted of one or more code block groups that occupy the fourth subband, the second code block group set includes the first code block group, and the first device further determines a contention window size of the fourth subband based on a CBG HARQ-ACK corresponding to the first code block group.

Specifically, that the second code block group set includes the one or more code block groups that occupy the fourth subband means that the second code block group set is a set including all code block groups that are in all the code block groups included in the third data packet and that occupy the fourth subband.

Further, the second code block group set includes a plurality of code block groups. In a possible implementation, that the first device further determines a contention window size of the fourth subband based on a CBG HARQ-ACK corresponding to the first code block group includes: further determining, by the first device, the contention window size of the fourth subband based on a HARQ state, for the fourth subband, that corresponds to the third data packet, where when CBG HARQ-ACKs corresponding to the code block groups in the second code block group are all ACKs, the HARQ state, for the fourth subband, that corresponds to the third data packet is an ACK; or when CBG HARQ-ACKs corresponding to the code block groups in the second code block group include one or more NACKs, the HARQ state, for the fourth subband, that corresponds to the third data packet is a NACK.

Further, the CBG HARQ-ACKs corresponding to the code block groups in the second code block group set include CBG HARQ-ACKs corresponding to all the code block groups in the second code block group set.

Optionally, the contention window size of the fourth subband is determined based on one or more HARQ states for the fourth subband that correspond to the one or more data packets, or the contention window size of the fourth subband may be determined based on whether there is at least one ACK in the one or more HARQ states for the fourth subband that correspond to the one or more data packets, or whether there is at least one NACK in the one or more HARQ states for the fourth subband that correspond to the one or more data packets.

In a possible implementation, the further determining, by the first device, the contention window size of the fourth subband based on a HARQ state, for the fourth subband, that corresponds to the third data packet includes: determining, by the first device, the contention window size of the fourth subband based on a HARQ state, for the fourth subband, that corresponds to a data packet in the third data packet set, where the third data packet set includes one or more data packets that are sent by the first device on the reference time unit and that occupy the fourth subband, and the third data packet set includes the third data packet. The contention window size of the fourth subband is determined based on one of the following information: a proportion of a NACK to the HARQ state, for the fourth subband, that corresponds to the data packet in the third data packet set; or a proportion of an ACK to the HARQ state, for the fourth subband, that corresponds to the data packet in the third data packet set; or a quantity of NACKs in the HARQ state, for the fourth subband, that corresponds to the data packet in the third data packet set; or a quantity of ACKs in the HARQ state, for the fourth subband, that corresponds to the data packet in the third data packet set; or whether the HARQ state, for the fourth subband, that corresponds to the data packet in the third data packet set is a NACK; or whether the HARQ state, for the fourth subband, that corresponds to the data packet in the third data packet set is an ACK. The HARQ state, for the fourth subband, that corresponds to the data packet in the third data packet set is represented by one or more HARQ-ACKs corresponding to the data packet in the third data packet set.

Further, the data packet in the third data packet set is all data packets in the third data packet set.

Further, the third data packet set includes all data packets that are sent by the first device on the reference time unit and that occupy the fourth subband.

Specifically, the data packet in the third data packet set includes a data packet sent by the first device to one or more receiving devices. This is similar to that the first device sends the one or more data packets to the one or more second devices.

Specifically, the one or more HARQ-ACKs corresponding to the data packet in the third data packet set are one or more HARQ-ACKs fed back by the one or more receiving devices, and are similar to the one or more HARQ-ACKs that are fed back by the one or more second devices and that correspond to the one or more data packets. The one or more receiving devices and the one or more second devices may be a same set, or may be different sets.

It should be understood that a correspondence between a data packet in the third data packet set and a HARQ-ACK corresponding to the data packet in the third data packet set herein is similar to a correspondence between the one or more HARQ-ACKs and the one or more data packets: Any data packet in the third data packet set may correspond to one or more HARQ-ACKs.

Optionally, the one or more HARQ states for the first subband that correspond to the one or more data packets include the HARQ state, for the first subband, that corresponds to the third data packet.

Optionally, the HARQ state, for the fourth subband, that corresponds to the data packet in the third data packet set includes the HARQ state, for the fourth subband, that corresponds to the third data packet.

Optionally, a data packet set (for example, the first data packet set, the second data packet set, or the third data packet set) includes one data packet, including but not limited to the first data packet, the second data packet, or the third data packet described below.

According to a second aspect, an embodiment of this disclosure provides a contention window size determining apparatus. The apparatus is applied to an access network device and includes units or means configured to perform the steps in the first aspect.

According to a third aspect, an embodiment of this disclosure provides a contention window size determining apparatus. The apparatus is applied to a terminal device and includes units or means configured to perform the steps in the first aspect.

According to a fourth aspect, this disclosure provides a communications apparatus, including a processor and a memory. The memory is configured to store a computer executable instruction, and the processor is configured to execute the computer executable instruction stored in the memory, so that the communications apparatus performs the method according to the first aspect.

According to a fifth aspect, this disclosure provides a computer readable storage medium. The computer readable storage medium stores an instruction, and when the instruction is run on a computer, the computer is enabled to perform the method according to the first aspect.

According to a sixth aspect, this disclosure provides a chip. The chip may be connected to a memory, and is configured to read and execute a software program stored in the memory, to implement the method according to the first aspect.

According to a seventh aspect, this disclosure provides a communications system. The communications system includes the access network device according to the second aspect and the terminal device according to the third aspect.

This disclosure provides a method for adjusting a CWS of a subband or a wideband that operates on an unlicensed spectrum. When a wideband data packet occupies a plurality of subbands, a sending node repeatedly uses a HARQ-ACK corresponding to the wideband data packet to adjust a CWS of each subband. In addition, when a receiving node feeds back a CBG-ACK, the sending node converts a plurality of CBG-ACKs for a subband that correspond to a same data packet into a TB-ACK, and then uses the TB-ACK to adjust a CWS of the subband. In this way, efficient access to a channel and friendly coexistence with surrounding contention nodes can be implemented, and notification signaling overheads are reduced.

DESCRIPTION OF EMBODIMENTS

The following describes the technical solutions in the embodiments of this disclosure with reference to the accompanying drawings in the embodiments of this disclosure. It should be noted that the technical solutions and features in the embodiments of this disclosure may be mutually combined when no conflict occurs.

In the embodiments of this disclosure, "a/an" means a single individual, and does not indicate that "a/an" can only be one individual and cannot be applied to another individual. For example, in the embodiments of this disclosure, "a terminal device" is a particular terminal device, and this does not mean that "a terminal device" can be applied only to one particular terminal device. The terms "system" and "network" may be used interchangeably in this disclosure.

A reference to "an embodiment" (or "an implementation") or "embodiments" (or "implementations") in this disclosure means that a specific feature, a structure, a feature, and the like that are described with the embodiments are included in at least one embodiment. Therefore, "in an embodiment" or "in the embodiments" that appears throughout this specification does not represent a same embodiment.

Further, in the embodiments of this disclosure, the terms "and/or" and "at least one" used in cases of "A and/or B" and "at least one of A and B" include any one of three scenarios: a scenario in which A is included but B is excluded, a scenario in which B is included but A is excluded, and a scenario in which both options A and B are included. In another example, in a case of "A, B, and/or C" and "at least one of A, B, and/or C", this phrase includes any one of six scenarios: a scenario in which A is included but both B and C are excluded, a scenario in which B is included but both A and C are excluded, a scenario in which C is included but both A and B are excluded, a scenario in which both A and B are included but C is excluded, a scenario in which both B and C are included but A is excluded, a scenario in which both A and C are included but B is excluded, and a scenario in which three options A, B, and C are included. As easily understood by a person of ordinary skill in the art and a related art, all other similar descriptions can be understood in the foregoing manner in the embodiments of this disclosure.

Figure 1:
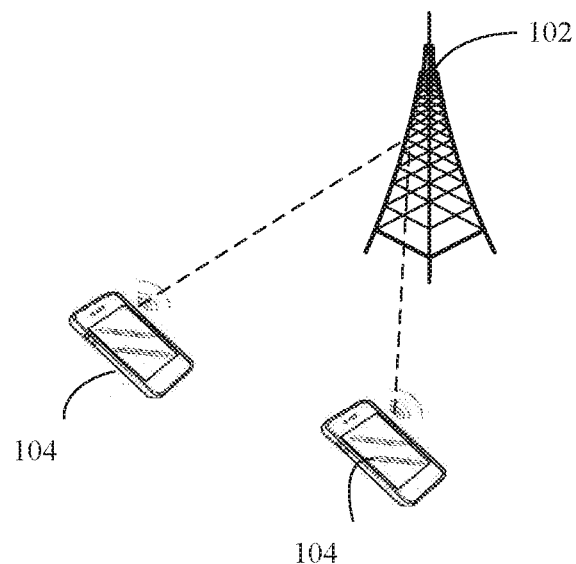
FIG. 1 is a schematic architectural diagram of a wireless communications system according to an embodiment of this disclosure.

FIG. 1 is a schematic diagram of communication between a wireless device and a wireless communications system. The wireless communications system may be a system to which various radio access technologies (RAT) are applied, for example, code division multiple access (CDMA), time division multiple access (TDMA), frequency division multiple access (FDMA), orthogonal frequency-division multiple access (OFDMA), single carrier frequency division multiple access (SC-FDMA), and another system. For example, the wireless communications system may be a long term evolution (LTE) system, a CDMA system, a wideband code division multiple access (wideband CDMA, WCDMA) system, a global system for mobile communications (GSM) system, a wireless local area network (WLAN) system, a new radio (NR) system, various evolved or converged systems, and a system using a future communications technology. A system architecture and a service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may learn that: With the evolution of network architectures and the emergence of new service scenarios, the technical solutions provided in the embodiments of this disclosure are also applicable to similar technical problems.

For brevity, FIG. 1 shows communication between one access network device 102 and two wireless devices 104 (for example, terminal devices). Usually, the wireless communications system may include any quantity of network devices and any quantity of terminal devices. The wireless communications system may further include one or more core network devices, a device used to carry a virtualized network function, or the like. The access network device 102 may provide services for the wireless devices by using one or more carriers. In this disclosure, the access network device and the terminal device are also collectively referred to as wireless apparatuses.

In this disclosure, the access network device 102 is an apparatus that is deployed in a radio access network to provide a wireless communication function for the terminal devices. The access network device may include a macro base station (BS), a micro base station (or referred to as a small cell), a relay node, an access point, or the like in various forms. In systems that use different radio access technologies, names of a device that has a radio access function may be different. For example, in an LTE system, the device is referred to as an evolved NodeB (eNB or eNodeB), and in a 3rd generation (3G) system, the device is referred to as a NodeB, and or the like. For ease of description, in this disclosure, the device that has the radio access function is briefly referred to as an access network device, or is referred to as a base station sometimes.

The wireless device in the embodiments of this disclosure may include various handheld devices, vehicle-mounted devices, wearable devices, or computing devices that have a wireless communication function, or other processing devices connected to a wireless modem. The wireless device may be referred to as a terminal device, or may be referred to as a mobile station (MS), a terminal, user equipment (UE), or the like. The wireless device may include a subscriber unit, a cellular phone, a smartphone, a wireless data card, a personal digital assistant (PDA) computer, a tablet computer, a modem or a modem processor, a handheld device, a laptop computer, a netbook, a cordless phone, or a wireless local loop (WLL) station, a Bluetooth device, a machine type communication (MTC) terminal, and the like. For ease of description, these wireless devices are briefly referred to as a terminal device or UE in this disclosure.

The wireless device may support one or more wireless technologies used for wireless communication, for example, 5G, LTE, WCDMA, CDMA, 1X, time division-synchronous code division multiple access (TS-SCDMA), GSM, 802.11, and the like. The wireless device may also support a carrier aggregation technology.

A plurality of wireless devices may perform a same service or different services, for example, a mobile broadband service, an enhanced mobile broadband (eMBB) service, and an ultra-reliable low-latency communication (URLLC) service.

Figure 2:
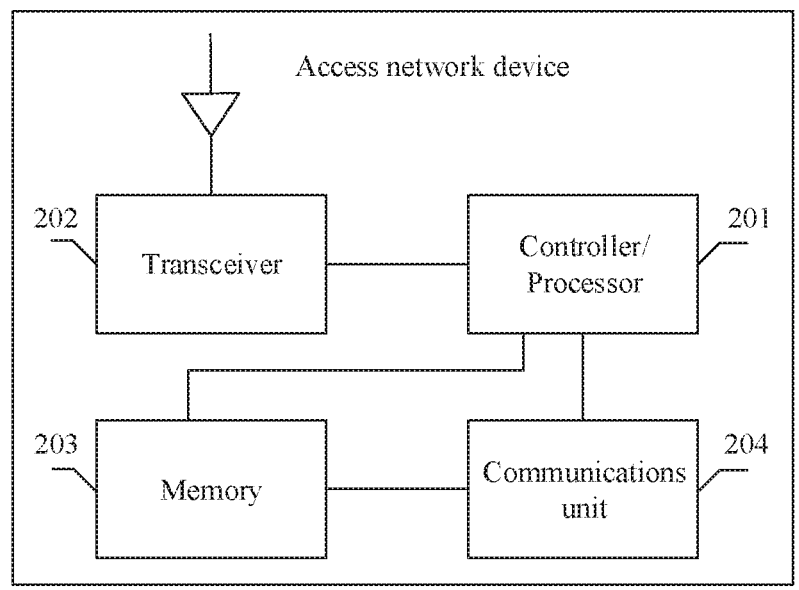
FIG. 2 is a schematic structural diagram of an access network device according to an embodiment of this disclosure.

Further, a possible schematic structural diagram of the access network device 102 may be shown in FIG. 2. The access network device 102 can perform a method provided in the embodiments of this disclosure. The access network device 102 may include a controller or processor 201 (the processor 201 is used as an example for description below) and a transceiver 202. The controller/processor 201 is also referred to as a modem processor sometimes. The modem processor 201 may include a baseband processor (BBP) (not shown). The baseband processor processes a received digitalized signal, to extract information or a data bit transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to: support information receiving and sending between the access network device 102 and the terminal devices, and support radio communication between the terminal devices. The processor 201 may be further configured to perform various functions for communication between the terminal device and another access network device. On an uplink, an uplink signal from the terminal device is received through an antenna, demodulated by the transceiver 202, and further processed by the processor 201, to restore service data and/or signaling information sent by the terminal device. On a downlink, service data and/or a signaling message are/is processed by the terminal device, modulated by the transceiver 202 to generate a downlink signal, and transmitted to UE through an antenna. The access network device 102 may further include a memory 203, and the memory 203 may be configured to store program code and/or data of the access network device 102. The transceiver 202 may include an independent receiver circuit and an independent transmitter circuit, or may include a circuit implementing receiving and sending functions. The access network device 102 may further include a communications unit 204, configured to support communication between the access network device 102 and another network entity, for example, configured to support the access network device 102 in communicating with an access network device or the like in a core network.

Optionally, the access network device may further include a bus. The transceiver 202, the memory 203, and the communications unit 204 may be connected to the processor 201 through the bus. For example, the bus may be a peripheral component interconnect (PCI) bus, an extended industry standard architecture (EISA) bus, and or the like. The bus may include an address bus, a data bus, a control bus, and the like.

Figure 3:
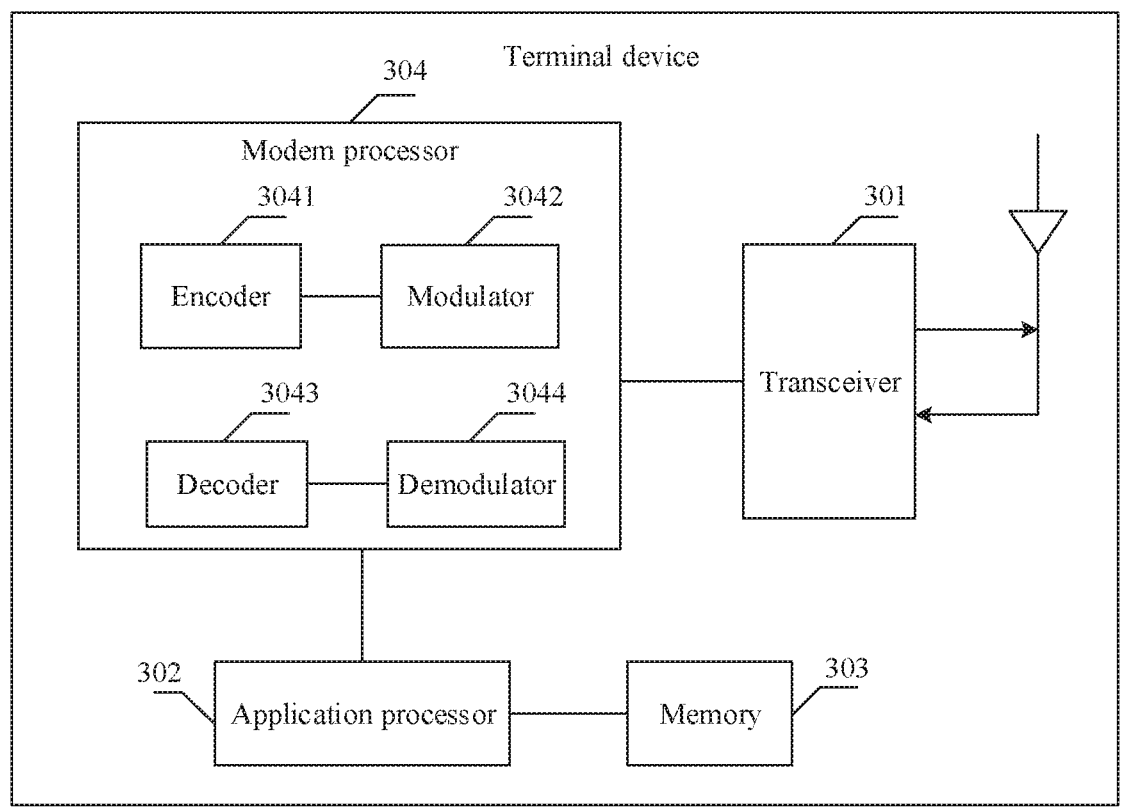
FIG. 3 is a schematic structural diagram of a terminal device according to an embodiment of this disclosure.

FIG. 3 is a possible schematic structural diagram of a terminal device in the foregoing wireless communications system. The terminal device can perform a method provided in the embodiments of this disclosure. The terminal device may be either of the two terminal devices 104. The terminal device includes a transceiver 301, an application processor 302, a memory 303, and a modem processor 304.

The transceiver 301 may adjust (for example, perform analog conversion, filtering, amplification, and up-conversion on) an output sample and generate an uplink signal. The uplink signal is transmitted to the base station in the foregoing embodiment through an antenna. On a downlink, the antenna receives a downlink signal transmitted by an access network device. The transceiver 301 may adjust (for example, perform Filtering, amplification, down-conversion, and digitalization on) a signal received from the antenna and provide an input sample.

The modem processor 304 is also referred to as a controller or a processor sometimes, and may include a baseband processor (BBP) (not shown). The baseband processor processes a received digitalized signal, to extract information or a data bit transmitted in the signal. Based on a requirement or an expectation, the BBP is usually implemented in one or more digits in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. These units perform processing based on a radio access technology used in a radio access network.

The modem processor 304 receives, from the application processor 302, digitalized data that may represent voice, data, or control information, and processes the digitalized data for transmission. The modem processor may support one or more of a plurality of wireless communication protocols of a plurality of communications systems, for example, LTE, new radio, a universal mobile telecommunications system (UMTS), and high speed packet access (HSPA). Optionally, the modem processor 304 may also include one or more memories.

Optionally, the modem processor 304 and the application processor 302 may be integrated in one processor chip.

The memory 303 is configured to store program code (sometimes referred to as a program, an instruction, software, or the like) and/or data that are/is used to support the terminal device in communication.

It should be noted that, the memory 203 or the memory 303 may include one or more storage units, for example, may be a storage unit that is in the processor 201 or the modern processor 304 or the application processor 302 and that is used to store program code, or may be an external storage unit independent of the processor 201 or the modem processor 304 or the application processor 302, or may be a component including a storage unit that is in the processor 201 or the modem processor 304 or the application processor 302 and an external storage unit that is independent of the processor 201 or the modem processor 304 or the application processor 302.

The processor 201 and the modem processor 301 may be processors of a same type, or may be processors of different types, for example, may be implemented as a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 301 may implement or execute various examples of logic blocks, modules, and circuits described with reference to content disclosed in the embodiments of this disclosure. Alternatively, the processor may be a combination of components implementing computing functions, for example, a combination of one or more microprocessors, a combination of a DSP and a microprocessor, or a system-on-a-chip (SOC).

A person skilled in the art may understand that various explanatory logic blocks, modules, circuits, and algorithms described with reference to the various aspects disclosed in this disclosure may be implemented as electronic hardware, an instruction that is stored in a memory or another computer readable medium and that is executed by a processor or another processing device, or a combination thereof. In an example, the devices described in this specification may be applied to any circuit, hardware component, IC, or IC chip. The memory disclosed in this disclosure may be any type of memory in any size, and may be configured to store any type of required information. To clearly explain such interchangeability, various explanatory components, blocks, modules, circuits, and steps have been generally described above based on functionality. How to implement such functionality depends on a specific disclosure, a design selection, and/or a design constraint that is imposed on an entire system. A person skilled in the art may use different manners to implement the described functions for each particular disclosure, but it should not be considered that such implementation goes beyond the scope of this disclosure.

Long term evolution (LTE) and 5G NR systems use an orthogonal frequency division multiplexing (OFDM) technology. A minimum resource unit used for data transmission is a resource element (RE), corresponding to one OFDM symbol in time domain and one subcarrier in frequency domain. Based on this, a resource block (RB) includes a plurality of consecutive OFDM symbols in time domain and a plurality of consecutive subcarriers in frequency domain, and is a basic resource scheduling unit.

In the LTE system, a subcarrier spacing of a data channel is fixedly 15 kHz. In the 5G NR system, to more flexibly use resources and support more diversified communication environments, a plurality of optional subcarrier spacings may be supported, including 15 kHz, 30 kHz, 60 kHz, and the like. A larger subcarrier spacing corresponds to a shorter uplink symbol length. For a 15 kHz×$2^n$ subcarrier spacing (n is a positive integer), a symbol length corresponding to the subcarrier spacing changes to $\frac{1}{2^n}$ of a symbol length corresponding to an original subcarrier spacing of 15 kHz, and correspondingly, a length of a transmission time interval (TTI) corresponding to a slot or a data packet also changes to $\frac{1}{2^n}$ of an original length.

To extend an available frequency band, a carrier aggregation (CA) technology is introduced into the LTE system, and a plurality of carriers are used to transmit data information. Each carrier (referred to as a component carrier (CC)) carries one or more transport blocks (TB). Downlink/uplink data transmission on each carrier is scheduled by using corresponding scheduling signaling (DL grant/UL grant) sent by an access network device. The carrier and a carrier carrying the scheduling signaling may be a same carrier (self-carrier scheduling), or may be different carriers (cross-carrier scheduling).

In the 5G NR system, in addition to data transmission through carrier aggregation, a wideband (WB) transmission technology may be further supported, and a bandwidth occupied by a carrier is extended, for example, from an original bandwidth of 20 MHz in the LTE system to N×20 MHz. In addition, to reduce complexity of fast Fourier transform or inverse fast Fourier transform (FFT or IFFT), a subcarrier spacing may also be increased. For example, an original spacing of 15 kHz in the LIE system is increased to N×15 kHz, so that a sampling rate remains unchanged while the bandwidth is increased. For example, a carrier of the NR wideband system is expanded to 40 MHz, the carrier includes two subbands (SBD), and a bandwidth of each subband is 20 MHz. One physical resource block (PRB) includes 12 subcarriers, and a subcarrier spacing is 30 kHz. One subframe includes 14 time domain symbols, each time domain symbol is ½ of a length of an LTE (with a 15 kHz subcarrier spacing) time domain symbol, and a length of a subframe is 0.5 ms. A transport block may be carried on a 40 MHz carrier×0.5 ms time-frequency resource.

To resolve a problem of a relatively small quantity of available frequency domain resources in a licensed frequency band, a licensed-assisted access using long term evolution (LAA-LTE) technology is introduced in Release 13 of LTE, and an enhanced licensed-assisted access (eLAA) technology is introduced in Release 14. An available frequency band may be extended to an unlicensed frequency band by using a carrier aggregation technology, and downlink and uplink information is transmitted on the unlicensed frequency band with assistance of the licensed frequency band. Based on the LAA and the eLAA, the Multefire standard further implements uplink and downlink transmission (including a traffic channel and a control channel) of an LTE system exclusively on the unlicensed frequency band without the assistance of the licensed frequency band, namely, standalone transmission.

To implement friendly coexistence with an access network device and a terminal device of different operators, and a wireless node in a different system such as Wi-Fi on an unlicensed frequency band, the LAA/eLAA/Multefire system uses an LBT channel access mechanism. Before sending information on the unlicensed frequency band, a sending node needs to listen to a channel, and sends downlink information after learning, through listening, that the channel is idle. Before occupying a resource, the sending node learns, through listening, that a channel is idle. This is referred to as an LBT success. Before occupying a resource, the sending node learns, through listening, that a channel is not idle. This is referred, to as an LBT failure.

After occupying a channel, the sending node may continuously occupy the channel to send information. Continuously occupying a time domain resource is referred to as a burst. After occupying the channel, a maximum time length for which the sending node can continuously send information is a maximum channel occupancy time (MCOT). After continuously occupying the channel for the MCOT, the sending node needs to release the channel, and can access the channel again after performing LBT again. When the sending node listens to the channel, there are two channel states: an idle state and a busy state. A channel state determining criterion is as follows: A wireless communications device compares power received on a channel in a listening slot with a clear channel assessment-energy detection (CCA-ED) threshold. If the power is greater than the detection threshold, the channel is in the busy state. If the power is less than the detection threshold, the channel is in the idle state.

The sending node may listen to a channel by using one of a plurality of channel access priority classes. Each priority class corresponds to a set of channel listening parameters (including a value range of a contention window size (CWS), an MCOT length, and the like). For example, a maximum CWS value corresponding to a priority class with a higher priority is smaller (it is easier to access a channel), and a DL MCOT length is shorter (a channel needs to be faster released). The set of channel listening parameters corresponding to each priority class is specified in a protocol or a regulation. For example, there are four access priorities for uplink transmission: a CW set {3, 7} of an access priority 1, a CW set {7, 15} of an access priority 2, a CW set {15, 31, 63, 127, 255, 511, 1023} of an access priority 3, and a CW set {15, 31, 63, 127, 255, 511, 1023} of an access priority 4. For another example, there are four access priorities for downlink transmission: a CW set {3, 7} of an access priority 1, a CW set {7, 15} of an access priority 2, a CW set {15, 31, 63} of an access priority 3, and a CW set {15, 31, 63, 127, 255, 511, 1023} of an access priority 4.

An access network device may send downlink information through a random backoff clear channel assessment (CCA) access channel. The terminal device may also send uplink information through the random backoff CCA access channel. Random backoff CCA is also referred to as type 1 channel access (type 1 channel access). In the random backoff CCA, a sending device randomly generates a backoff counter, decreases the backoff counter by one when learning, through listening, that a channel is idle, and accesses the channel after completing countdown of the backoff counter. A specific random backoff CCA procedure is as follows: The sending device uniformly and randomly generates a backoff counter N between 0 and an initial CW, and listens to a channel at a granularity of listening slot (CCA slot) (for example, 9 μs), and decreases the backoff counter N by 1 if the sending device detects that the channel is idle in a listening slot. On the contrary, if the sending device detects that the channel is busy in a listening slot, the sending device suspends the backoff counter. In other words, the backoff counter N remains unchanged when the channel is busy, and the backoff counter counts down only when it is detected that the channel is idle. N is a natural number. When the backoff counter is decreased to zero, it is considered that channel listening succeeds, and the sending device may immediately occupy the channel to send information.

In addition, after the backoff counter is decreased to zero, the sending device may alternatively wait for a period of time instead of immediately sending information. After the waiting ends, the sending device performs listening on an additional slot before a moment at which the information needs to be sent. If the sending device learns, through listening in the additional slot, that a channel is idle, it is considered that channel listening succeeds, and the sending device may immediately send the information. If the backoff counter is not decreased to zero before a moment at which the information needs to be sent, or if it is detected that a channel is busy in the additional listening slot, it is considered that channel listening fails. The sending device includes a terminal device or an access network device. After the access network device successfully performs the random backoff CCA, a corresponding MCOT is a DL MCOT. After the terminal device successfully performs the random backoff CCA, a corresponding MCOT is a UL MCOT. The CW length is also referred to as a CW size (CWS).

To balance friendly coexistence with an adjacent node on an unlicensed frequency band and improvement of channel access efficiency, the sending node dynamically adjusts a CWS and uses the CWS for next channel listening. Specifically, before sending the information, the sending node determines a previous reference time unit on which a data packet is sent, and dynamically adjusts the CWS based on a hybrid automatic repeat request-acknowledgement, (HARQ-ACK) (or referred to as a HARQ acknowledgment, HARQ information, a HARQ feedback, a HARQ acknowledgment feedback, a HARQ receiving state, or the like) fed back by a receiving node based on the data packet on the reference time unit. The receiving node feeds back the HARQ-ACK to the sending node, so that the sending node retransmits a data packet that is incorrectly transmitted. For example, when the HARQ-ACK corresponding to the data packet on the reference time unit does not include an acknowledgment (ACK) state or a proportion of a negative acknowledgment (NACK) state is relatively large, the sending node increases the CWS, and performs channel listening based on an increased. CW during next LBT, to avoid a collision with a surrounding contention node at the cost of an extended listening time period, thereby implementing friendly coexistence with the surrounding contention node. When the HARQ-ACK corresponding to the data packet on the reference time unit includes an ACK state or the proportion of a NACK state is relatively small, the sending node decreases the CWS, to shorten a listening time period and improve channel access efficiency. For another example, when the sending node receives one or more ACKs for the reference time unit, the sending node decreases the CWS; when the sending node receives one or more NACKs for the reference time unit, the sending node increases the CWS.

In the 5G NR system, downlink transmission and uplink transmission on the unlicensed spectrum may also be supported, and standalone transmission exclusively on the unlicensed spectrum may be supported. In addition, in the 5G NR, a wideband WB technology may be further used on the unlicensed spectrum. The wideband technology shortens a time domain granularity for data transmission, for example, a length of a time domain symbol and a length of a subframe are shortened. Sending nodes in the LTE and NR systems perform channel access on the unlicensed spectrum at a granularity of symbol or subframe. Therefore, compared with channel preemption efficiency of a narrowband system in the LTE system, channel preemption efficiency of a wideband system that operates on the unlicensed spectrum is improved. For example, when a subcarrier spacing is 15 kHz, a length of a slot is 1 ms, and there is only one channel access opportunity within 1 ms. When a subcarrier spacing is 30 kHz, a length of a slot is 0.5 ms. Therefore, there are two channel access opportunities within 1 ms.

In addition, the NR wideband system further reduces control signaling overheads. For example, for a CA system and a WB system with a same subcarrier spacing (SCS), in an N×20 MHz CA system, one data packet is carried on each 20 MHz carrier and requires one piece of scheduling information, and N pieces of scheduling information are required in total. However, in an N×20 MHz WB system, one data packet is carried on an entire N×20 MHz carrier, and only one piece of scheduling information is required in total. Similarly, in the N×20 MHz CA system, a receiving node needs to feed back N pieces of HARQ acknowledgement information for N data packets, while in the N×20 MHz WB system, aa receiving node needs to feed back only one piece of HARQ acknowledgement information for the entire N×20 MHz carrier.

Figure 4:
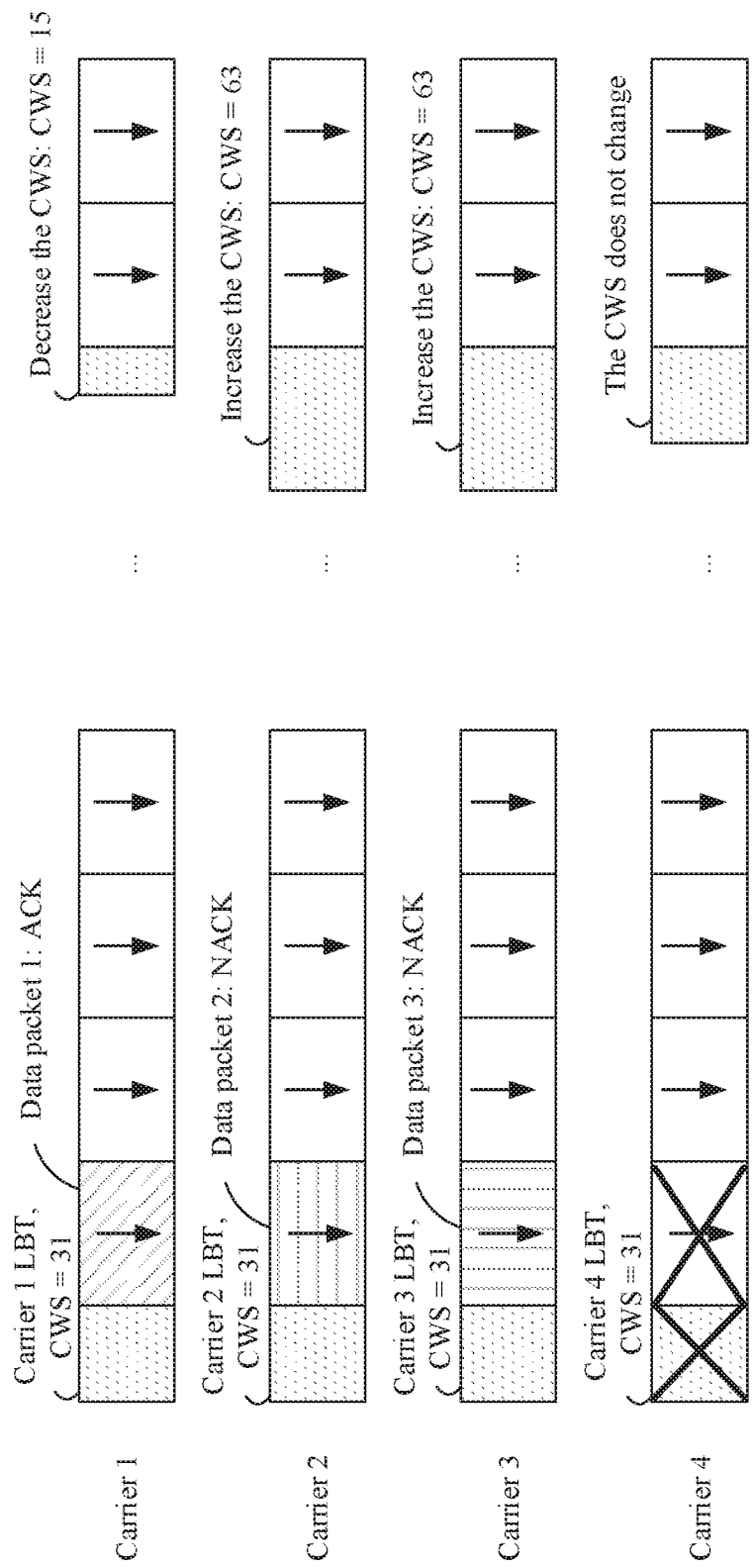
FIG. 4 is a schematic diagram of CWS adjustment for a subband in an LTE multi-carrier transmission system.

In an existing LTE multi-carrier transmission system, a sending node independently performs LBT on each carrier. For any carrier, after the LBT succeeds, the sending node occupies the carrier to send a data packet. FIG. 4 is a schematic diagram of CWS adjustment for a subband in the LTE multi-carrier transmission system. In FIG. 4, an access network device separately performs LBT on a carrier 1 to a carrier 4. LBT listening on the carrier 1 to the carrier 3 succeeds, and the three carriers are occupied. If a HARQ-ACK corresponding to a data packet 1 on a reference time unit on the carrier 1 is an ACK, a CWS of the carrier 1 is decreased. If a HARQ-ACK corresponding to a data packet 2 on the reference time unit on the carrier 2 and a HARQ-ACK corresponding to a data packet 3 on the reference time unit on the carrier 3 are NACKs, CWSs of the carrier 2 and the carrier 3 each are increased.

In an NR wideband system on an unlicensed spectrum, a dynamic wideband channel listening mechanism may be used to improve channel use efficiency. To be specific, although the sending node (the access network device or the terminal device) may occupy a plurality of subbands to send one data packet, LBT is still performed at a granularity of subband (for example, a 20 MHz subband). In addition, the sending node occupies only a subband on which LBT succeeds to send a data packet or a part of the data packet, and does not occupy a subband on which LBT fails. Therefore, in the NR wideband system on the unlicensed spectrum, after LBT is performed on a carrier, only some sub bands on the carrier may be occupied, unlike the LTE system in which listening is performed on an entire carrier, after LBT succeeds, all bandwidths of the carrier may be occupied to send a data packet, and if LBT fails, the bandwidths of the carrier are all released. In other words, in the NR wideband system, a frequency domain range occupied by a data packet (or a frequency domain range corresponding to a HARQ-ACK) may be different from a frequency domain range corresponding to LBT performed by the sending node. For example, the former may be greater than the latter.

Figure 5:
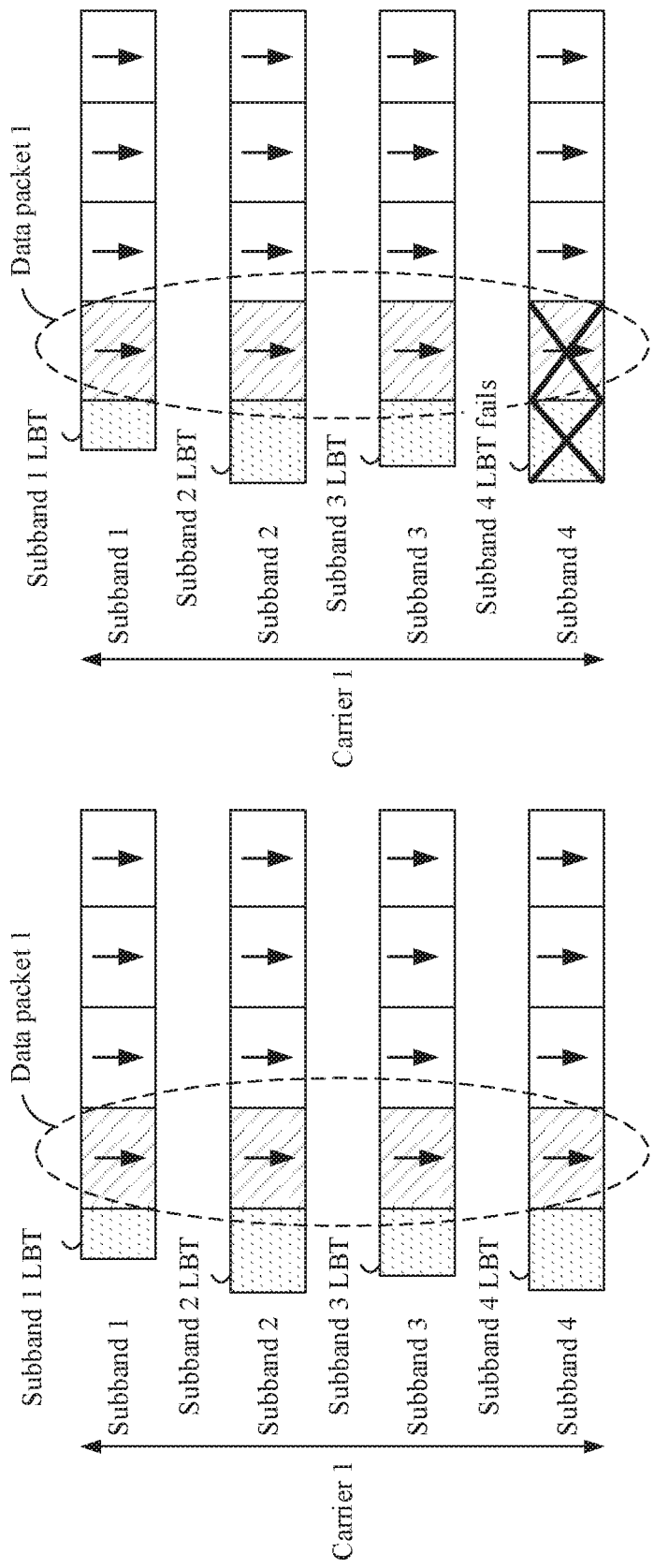
FIG. 5(a) and FIG. 5(b) are a schematic diagram of a dynamic channel listening mechanism according to an embodiment of this disclosure.

FIG. 5(*a*) and FIG. 5(*b*) are a schematic diagram of a dynamic wideband channel listening mechanism. In FIG. 5(*a*) and FIG. 5(*b*), a data packet 1 occupies a carrier 1, and the carrier 1 includes {a subband 1, a subband 2, a subband 3, and a subband 4}. Before sending the data packet 1, the terminal device separately performs LBT on the subband 1 to the subband 4, and occupies only a subband on which LBT succeeds to send the data packet 1. If LBT succeeds on only some subbands but fails on the other subbands, a subband on which LBT succeeds carries some information of the data packet 1. In FIG. 5(*a*), if LBT succeeds on all subbands, the subband 1 to the subband 4 are occupied to send the data packet 1. In FIG. 5(*b*), if LBT on the subband 4 fails, and the LBT on the subband 1 to the subband 3 succeeds, only some information, of the data packet 1, on the subband 1 to the subband 3 is sent, and information on the subband 4 is discarded (or referred to as puncturing, puncture).

Although the NR system may reuse a transmission solution similar to that in the LTE multi-carrier system, one data packet is carried on only one subband, in other words, one HARQ-ACK is generated for only one subband. In this way, a CWS of each subband can be adjusted based on a HARQ-ACK corresponding to the subband. However, this method cannot reduce signaling overheads (namely, the scheduling information and the HARQ-ACK information described above) in the NR wideband system.

Therefore, during NR wideband transmission, a received HARQ-ACK crosses subbands, in other words, one HARQ-ACK reflects channel states of a plurality of subbands. How to determine a CWS of a subband based on a HARQ-ACK corresponding to a wideband data packet is a problem that needs to be considered.

Figure 6:
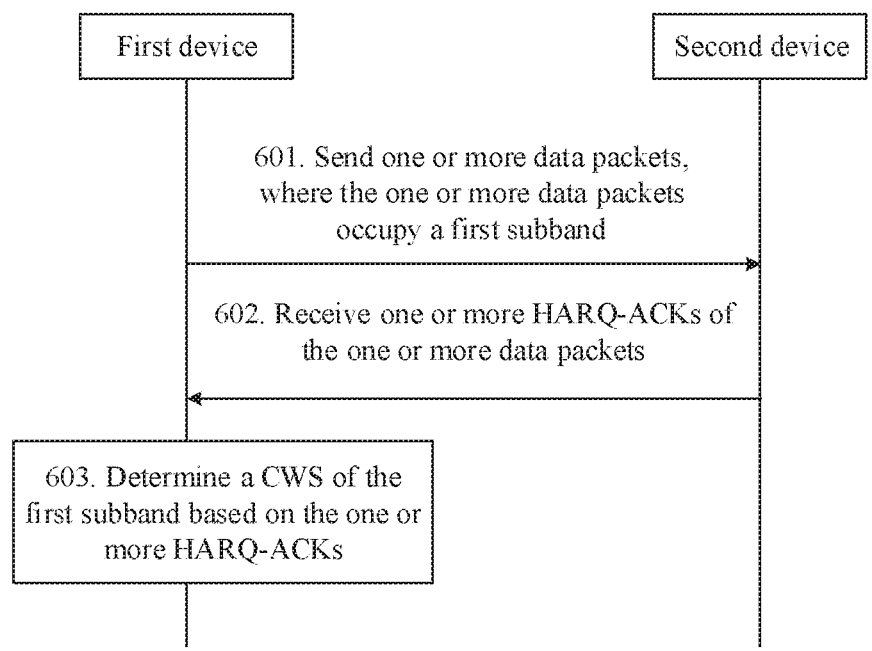
FIG. 6 is a flowchart of a CWS adjustment method according to an embodiment of this disclosure.

To resolve the foregoing problem, an embodiment of this disclosure provides a wideband CWS determining method, so that when a wideband data packet in a wideband NR system on an unlicensed spectrum occupies a plurality of subbands, a subband CWS can be adjusted based on a wideband HARQ-ACK corresponding to the wideband data packet. As shown in FIG. 6, the wideband CWS adjustment method may be applied to the network architecture shown in FIG. 1, an access network device in the method may be applied to the schematic structural diagram in FIG. 2, and a terminal device may be applied to the schematic structural diagram in FIG. 3. In the method provided in this embodiment of this disclosure, when a first device is an access network device, a second device is a terminal device. When the first device is a terminal device, the second device is an access network device. The method includes the following steps.

Step 601: The first device sends one or more data packets to one or more second devices on a reference time unit, where the one or more data packets occupy a first subband.

It should be understood that a data packet (for example, a first data packet, a second data packet, a third data packet, a fourth data packet, or a fifth data packet) in this disclosure may be a bit sequence before modulation and coding, and is also referred to as a transport block TB, an original cell, or a media access control protocol data unit (MAC PDU). Alternatively, a data packet may be data information obtained after modulation and coding. In this case, the data packet corresponds to data information obtained after modulation and coding is performed on a TB or a MAC PDU. A time domain resource corresponding to a data packet is a transmission time interval (TTI). That a data packet is carried on one or more subbands (for example, as described below, the first data packet is carried on a plurality of subbands including the first subband, the second data packet is carried on at least the first subband and a third subband, the third data packet is carried on a plurality of subbands including the first subband, or the fourth data packet is carried on one or more subbands including the first subband) means that a frequency domain resource to which the data packet is mapped corresponds to the one or more subbands. A HARQ-ACK fed back by a receiving device may be fed back for each data packet. In other words, the receiving device feeds back one HARQ-ACK for one data packet. Alternatively, the receiving device may feed back a plurality of HARQ-ACKs for one data packet.

Optionally, the data packet is a complete data packet. The complete data packet includes complete cell bit information and complete coding information. For example, the data packet is a complete TB or a complete MAC PDU. For another example, the data packet is a complete information sequence obtained after the first device performs modulation and coding on a complete TB or a complete MAC PDU, and includes a complete cell sequence and complete coding information of the TB or the MAC PDU.

Optionally, the data packet is a partial data packet, that is, the data packet includes some data information in a complete data packet. For example, the data packet includes some information in a complete TB, but does not include the other information in the complete TB. Alternatively, the data packet includes some information in a complete MAC PDU, but does not include the other information in the complete MAC PDU. For another example, the data packet is one part of a complete information sequence obtained after the first device performs modulation and coding on a complete TB or a complete MAC PDU, and does not include the other part of the complete information sequence. When the first device is expected to send a wideband data packet (a complete data packet), the first device needs to independently perform LBT on each subband included in a wideband. LBT performed on some subbands, namely, the one or more subbands may succeed, but LBT on the other subbands fails. In this case, the first device occupies only the one or more subbands, and punctures information, in the wideband data packet, carried on the other subbands. In this case, a data packet that is sent by the first device by occupying the one or more subbands is a part of the wideband data packet. Therefore, the data packet is a partial data packet.

It should be understood that, in this disclosure, a subband may be a frequency domain resource used to carry downlink information or uplink information. The subband may be a subband included in the one or more subbands, or may be the first subband, a second subband, a third subband, a fourth subband, or a fifth subband. Optionally, the subband may include one or more subcarriers, or the subband may include one or more physical resource blocks (PRB), or the subband may be a frequency domain resource corresponding to a bandwidth of 5 MHz, 10 MHz, 15 MHz, or 20 MHz. For example, this frequency band may correspond to a frequency domain resource occupied by one carrier in an LTE system.

Alternatively, the subband may be a carrier, or the subband may be referred to as a bandwidth part (BWP).

Optionally, the subband is a frequency domain unit on which the access network device or the terminal device performs channel listening. For example, the first device performs a channel listening procedure for the subband (performs another independent channel listening procedure for another different subband), or maintains a CWS for the subband. (maintains another independent CWS for another subband). In other words, the first device performs independent channel listening procedures for different subbands, or maintains independent contention window sizes for different subbands. For another example, when performing channel listening, the first device compares energy or power detected in a listening slot on the subband with a listening threshold CCA-ED corresponding to the subband, to determine whether the channel is busy or idle (independently determine whether another subband is busy or idle). For another example, the first device can occupy the subband to send information only after LBT on the subband succeeds (independently determine whether LBT on another subband succeeds).

Optionally, the subband is a frequency domain unit on which the receiving device measures a channel. For example, channel measurement performed by the receiving devices at a granularity of subband includes: channel quality indicator (CQI)/recoding matrix indicator (PMI) measurement or radio resource management (RRM) measurement. In other words, the receiving device reports a CQI/PMI/RRM measurement result in one subband. In other words, the receiving device performs CQI/PMI/RRM measurement within a limited range of one subband, and does not perform cross-subband measurement.

In this disclosure, a time unit (for example, the reference time unit) is one or more consecutive transmission time intervals, one or more consecutive slots, or one or more time domain symbols that are consecutive in time. Each TTI included in the time unit may be a complete TTI (to be specific, all time domain resources corresponding to the TTI are occupied to send information), or may be a partial TTI (to be specific, some time domain resources corresponding to the TTI are occupied to send information, and the other time domain resources are retained as idle). Optionally, the time unit may be a slot or a TTI slot may be a 1 ms slot, or may be referred to as a subframe with a length of 1 ms, or may be shorter than 1 ms. The slot may correspond to 14 time domain symbols, or may correspond to less than 14 time domain symbols. When the slot includes less than 14 time domain symbols, the slot corresponds to a short transmission time interval (short TTI, sTTI). In this case, the slot is referred to as a mini-slot or a non-slot. For uplink transmission, a slot is a time domain granularity for uplink resource allocation or uplink transmission, or a slot is a minimum time domain unit on which the terminal device performs uplink transmission or sends an uplink data packet. An optional length that may be supported by an uplink mini-slot includes seven uplink symbols, one uplink symbol, two uplink symbols, three uplink symbols, or four uplink symbols. An uplink symbol may be a single carrier frequency division multiplexing access symbol (SC-FDMA symbol), or may be an orthogonal frequency division multiplexing access symbol (OFDMA symbol). For downlink transmission, a slot is a time domain granularity for downlink resource allocation or downlink transmission, or a slot is a minimum time domain unit on which the access network device performs downlink transmission or sends a downlink data packet. An optional length that may be supported by a downlink mini-slot includes seven downlink symbols, one downlink symbol, two downlink symbols, three downlink symbols, or four downlink symbols. A downlink symbol may be an OFDMA symbol. The uplink mini-slot or downlink mini-slot further supports another TTI length shorter than 1 ms. Optionally, the time unit may alternatively be at least two slots that are consecutive in time. For example, on an unlicensed spectrum, the time unit may be a burst including a plurality of TTIs that are consecutive in time.

In this disclosure, a burst (for example, a first uplink burst or a first downlink burst) is one or more consecutive time units occupied by the first device to send information. An uplink burst may include one or more consecutive time units occupied by the terminal device to send uplink information. A downlink burst may include one or more consecutive time units occupied by the access network device to send downlink information. When the burst includes at least two consecutive time units, the "consecutive" herein may mean consecutive occupation on a channel. To be specific, the first device continuously occupies the at least two time units to send information. The "consecutive" herein may alternatively mean consecutive sequence numbers of time units (for example, TTIs, subframes, slots slot, or symbols). In other words, there may be a gap or no gap between any two adjacent time units in the at least two consecutive time units and that are included one burst. Specifically, the first uplink burst or the first downlink burst is a burst including the reference time unit.

It should be understood that, for a $c^{th}$ ($c$ is a positive integer) data packet (for example, the first data packet, the second data packet, the third data packet, the fourth data packet, or the fifth data packet, or a data packet in a first data packet set, a data packet in a second data packet set, or a data packet in a third data packet set) that is sent by the first device on the reference time unit and that is carried on one or more subbands, when the $c^{th}$ data packet is carried on only one subband (for example, the first subband), the data packet may also be referred to as a narrowband data packet, or when the $c^{th}$ data packet is carried on at least two subbands, the $c^{th}$ data packet may also be referred to as a wideband data packet.

Further, for any one (for example, the first subband, the second subband, the third subband, or the fourth subband) of the one or more subbands, it may be considered that the any subband carries the $c^{th}$ data packet.

Optionally, that the $c^{th}$ data packet is carried on at least one subband (for example, the plurality of subbands including the first subband, or the first subband and the third subband) means that the $c^{th}$ data packet occupies only the at least one subband, and does not occupy a subband other than the at least one subband. In other words, all information in the $c^{th}$ data packet is mapped to the at least one subband.

Optionally, that the $c^{th}$ data packet is carried on the at least one subband means that the $c^{th}$ data packet occupies the at least one subband. In this case, the $c^{th}$ data packet may further occupy a subband other than the at least one subband. This is not limited. For example, some information in the $c^{th}$ data packet is mapped to the at least one subband, and the other information is mapped to a subband other than the at least one subband.

Optionally, that a $d^{th}$ ($d$ is a positive integer) CBG (for example, one or more CBGs included in the second data packet, a CBG in a first code block group set, a CBG in a second code block group set, or a first CBG) is carried on at least one subband (for example, the first subband and/or the fourth subband) means that the $d^{th}$ CBG occupies only the at least one subband, and does not occupy a subband other than the at least one subband. In other words, all information in the $d^{th}$ CBG is mapped to the at least one subband.

Optionally, that the $d^{th}$ CBG is carried on the at least one subband means that the $d^{th}$ CBG occupies the subband. In this case, the $d^{th}$ CBG may further occupy a subband other than the band. This is not limited. For example, some information in the $d^{th}$ CBG is mapped to the at least one subband, and the other information is mapped to a subband other than the at least one subband.

It should be understood that, for any subband (for example, the first subband to the fourth subband) in the one or more subbands that carry the $e^{th}$ data packet, it may be considered that the $e^{th}$ data packet occupies the subband. Specifically, that the $c^{th}$ data packet occupies the subband means that the $c^{th}$ data packet occupies all or some frequency domain resources of the subband, or the $c^{th}$ data packet is mapped to at least one physical resource block (PRB) of the subband. Further, the frequency domain resource herein is specifically a frequency domain resource that may be used to carry data information. When the $c^{th}$ data packet occupies some frequency domain resources of the subband, the other frequency domain resources of the subband may be used to carry information, other than the $c^{th}$ data packet, that the first device is to send, for example, information sent to a receiving device other than a receiving device corresponding to the $c^{th}$ data packet, or may be used to carry information to be sent by a sending device other than the first device.

In addition, that the $c^{th}$ data packet occupies the subband means at all or some information in the $c^{th}$ data packet is mapped to the subband. In addition, the $c^{th}$ data packet possibly occupies another subband. For example, some information in the $c^{th}$ data packet is mapped to the subband, and the other information is mapped to the another subband. In other words, the $c^{th}$ data packet is a cross-subband data packet.

Similarly, that the $d^{th}$ CBG occupies one subband (for example, the first subband to the fourth subband) means that the $d^{th}$ CBG occupies all or some frequency domain resources of the subband. In addition, that the $d^{th}$ CBG occupies the subband means that all or some information in the $d^{th}$ CBG is mapped to the subband. In addition, the $d^{th}$ CBG possibly occupies another subband. For example, some information in the $d^{th}$ CBG is mapped to the subband, and the other information is mapped to the another subband. In other words, the $d^{th}$ CBG is a cross-subband CBG.

Optionally, when the first device is an access network device and the second device is a terminal device, the one or more data packets are downlink data packets, and the reference time unit is a downlink reference time unit.

Optionally, when the first device is a terminal device and the second device is an access network device, the one or more data packets are uplink data packets, and the reference time unit is an uplink reference time unit.

Optionally, the first device is a sending device, and the second device is a receiving device.

Step 602: The first device receives one or more hybrid automatic repeat request-acknowledgements HARQ-ACKs that are fed back by the one or more second devices and that correspond to one or more data packets.

In the LTE system, ACK or NACK feedback and HARQ retransmission are both performed in one transport block TB. In other words, each TB corresponds to one HARQ-ACK. Considering coding and decoding complexity and advantages of fast encoding and decoding processing, one transport block TB may be divided into a plurality of code blocks (CB) for separately channel encoding and decoding. Usually, each CB has an independent check function. For example, for a turbo code, a CB cyclic redundancy check (CRC) is performed on each CB before encoding. In this way, after decoding each CB, a receiving node may determine, through a CRC check, whether the current CB is correctly decoded.

Figures 7A, 7B:
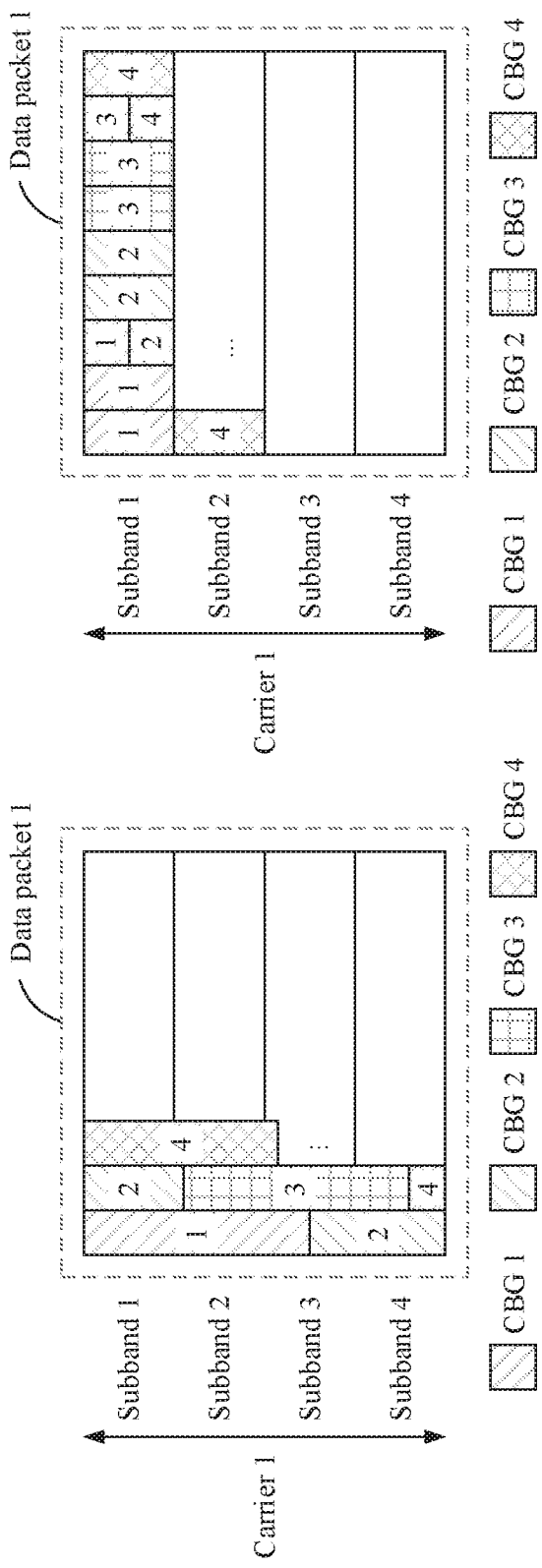
FIG. 7(a) and FIG. 7(b) are a schematic diagram of a CBG mapping mode according to an embodiment of this disclosure.

An Low Density Parity Check Code (LDPC) is introduced into a 5G NR system, and one TB may be divided into more CBs. For the LDPC, a CB CRC may also be performed on each CB, or an encoding matrix of the LDPC has a check function. To be specific, each CB of the LDPC may also have a check function. Therefore, it can be learned that if some CBs in a TB are not correctly received, the terminal device feeds back a NACK to the access network device, and the access network device subsequently performs HARQ retransmission on the entire TB (including all CBs in the TB). If a small quantity of CBs are not correctly received, and other CBs are all correctly received, efficiency of HARQ feedback and retransmission performed based on a TB in the prior art decreases. Consequently, system transmission efficiency is affected. Therefore, a HARQ feedback with a finer granularity is introduced into the NR system, and one TB is divided into K>1 CB groups (CBG). K is a positive integer. Each CBG includes one or more CBs, and one data packet includes one or more CBGs. A HARQ-ACK is fed back in one CBG. In other words, the receiving device feeds back one HARQ-ACK for one CBG, and each HARQ-ACK corresponds to one CBG. When a HARQ-ACK corresponding to any CBG in the TB is a NACK or discontinuous transmission (DTX), it indicates that the TB is not correctly received. However, during retransmission, the sending device may transmit only a CBG that is not correctly received, and does not need to retransmit a CBG correctly received in a same TB, thereby saving resources during retransmission. The NR system supports HARQ-ACK feedback in one TB, which is referred to as a TB HARQ-ACK or a TB-ACK (TB-ACK), and also supports HARQ-ACK feedback in one CBG, which is referred to as a CBG HARQ-ACK or a CBG-acknowledgement (CBG-ACK). A plurality of CBGs included in a data packet may be mapped to a physical resource first in frequency domain and then in time domain within a wideband range occupied by the data packet, as shown FIG. 7(*a*). Alternatively, a plurality of CBGs included in a data packet may be mapped to each subband in frequency domain and then in time domain within a wideband range occupied by the data packet. Each time a subband is fully mapped, mapping is performed on a next subband, as shown in FIG. 7(*b*).

It should be understood that the first device receives the one or more HARQ-ACKs that correspond to one or more data packets and that are fed back by the one or more second devices. Any one of the one or more data packets may correspond to one or more HARQ-ACKs. For example, the HARQ-ACK corresponding to the any data packet may be a TB-ACK corresponding to the any data packet, or may be one or more CBG-ACKs corresponding to one or more CBGs included in the any data packet. The HARQ-ACK corresponding to the any data packet may be one of the following cases:

(1) All HARQ-ACKs corresponding to any data packet (for example, Embodiment 1 and Embodiment 2 described below). For example, when the HARQ-ACK fed back by the second device is a TB-acknowledgement, the HARQ-ACK corresponding to the any data packet is one HARQ-ACK, namely, a TB-ACK. For another example, the one or more data packets include a plurality of CBGs, and when the HARQ-ACK fed back by the second device is a CBG HARQ-ACK, the HARQ-ACK corresponding to the any data packet is all CBG-ACKs for the one or more data packets.

(2) Some of all HARQ-ACKs corresponding to the any data packet. To be specific, some of all the HARQ-ACKs corresponding to the any data packet are included, and the other HARQ-ACKs are not included (for example, Embodiment 4 described below). In other words, the HARQ-ACK corresponding to the any data packet is a HARQ-ACK corresponding to some information in the any data packet. Specifically, the HARQ-ACK corresponding to the any data packet is one or more CBG HARQ-ACKs corresponding to one or more CBGs included in the any data packet. For example, the one or more data packets include P>1 CBGs, the HARQ-ACK corresponding to the any data packet is CBG-ACKs corresponding to M CBGs, M<P, and M and P are natural numbers.

For any one of the one or more data packets, the HARQ-ACK corresponding to the any data packet may be carried in control information sent by the second device or the receiving device. For example, when the first device is an access network device, and the second device/receiving device is a terminal device, the HARQ-ACK corresponding to the any data packet may be carried on a physical uplink control channel PUCCH or a physical uplink service channel PUSCH. When the first device is a terminal device, and the second device/receiving device is an access network device, the HARQ-ACK corresponding to the any data packet may be carried on a physical downlink control channel PDCCH. Specifically, all HARQ-ACKs corresponding to the any data packet may be carried in scheduling information on the PDCCH, or may be carried in feedback information on the PDCCH, or some HARQ-ACKs may be carried in the scheduling information, and the other HARQ-ACKs may be carried in the feedback information. The scheduling information is control information used to schedule the terminal device to send uplink information. For example, the scheduling information is a UL grant, and an NDI field in the UL grant may be used to indicate a HARQ-ACK corresponding to an uplink data packet. The feedback information includes the HARQ-ACK corresponding to the uplink data packet but does not include the scheduling information. Specifically, the feedback information indicates, through a bitmap, a HARQ-ACK corresponding to each HARQ process number in a HARQ process number set. For example, each bit corresponds to a HARQ process number, an ACK is represented by '1' in binary, and a NACK is represented by '0' in binary. Alternatively, the feedback information indicates, through a bitmap, a HARQ-ACK corresponding to each CBG of each HARQ process number in a HARQ process number set. For example, each bit corresponds to a CBG in a HARQ process number, an ACK is represented by '1' in binary, and a NACK is represented by '0' in binary.

It should be understood that any HARQ-ACK (namely, any one of the one or more HARQ-ACKs, or a CBG HARQ-ACK corresponding to a code block group in a second code block group set) corresponding to one or more data packets on a downlink reference time unit or a CBG included in the one or more data packets may be an ACK or a NACK. Optionally, any HARQ-ACK (namely, any one of the one or more HARQ-ACKs) corresponding to the one or more data packets on the downlink reference time unit or the CBG included in the one or more data packets may be an ACK, a NACK, or DTX. For example, if the terminal device determines that the data packet/CBG is correctly received, the corresponding HARQ-ACK is an ACK. If the terminal device determines that the data packet/CBG is incorrectly received, the HARQ-ACK is a NACK. If the terminal device does not detect the data packet/CBG or a downlink data channel on which the data packet/CBG is located, or if the access network device does not detect HARQ information fed back by the terminal device for the data packet/CBG, the HARQ-ACK is DTX. Alternatively, if the terminal device does not detect a downlink data channel on which the data packet/CBG is located, the HARQ-ACK is a NACK. In other words, the NACK is used to indicate that the data packet or the downlink data channel is not detected.

It should be understood that any HARQ-ACK (namely, any one of the one or more HARQ-ACKs, or a CBG HARQ-ACK corresponding to a code block group in a second code block group set) corresponding to the one or more data packets on an uplink reference time unit or a CBG included in the one or more data packets may be an ACK or a NACK. For example, if the access network device determines that a data packet/CBG is correctly received, a corresponding HARQ-ACK is an ACK.

Alternatively, if the access network device determines that a data packet/CBG is incorrectly received, a corresponding HARQ-ACK is a NACK. Alternatively, if the access network device does not detect a data packet/CBG or an uplink data channel on which the data packet/CBG is located, a HARQ-ACK is a NACK. In other words, the NACK is used to indicate that the data packet is not detected. Alternatively, when the terminal device does not detect HARQ information fed back by the access network device for the data packet/CBG, a HARQ-ACK is DTX.

It should be understood that for any one of the one or more HARQ-ACKs, "one" means that the "one" HARQ-ACK corresponds to one data packet, one TB, one CBG, or one HARQ state. For example, the "one" HARQ-ACK is in a NACK state, an ACK state, or a DTX state. For example, when the HARQ-ACK is a TB-ACK, the "one" HARQ-ACK corresponds to one data packet or one TB. When the HARQ-ACK is a CBG-ACK, the "one" HARQ-ACK corresponds to one CBG.

Step 603: The first device determines a CWS of the first subband based on the one or more HARQ-ACKs.

It should be understood that the first device determines a CWS based on a HARQ-ACK corresponding to a data packet (for example, the first data packet, the second data packet, the third data packet, or the fourth data packet, or a data packet in the first data packet set, a data packet in the second data packet set, or a data packet in the third data packet set) carried on the reference time unit, and performs channel listening (for example, random backoff CCA) based on the CW. In other words, the reference time unit is a time unit on which the first device adjusts the CWS. The reference time unit is earlier than a moment at which the first device determines the CWS or a moment at which the first device starts channel listening. Further, before adjusting the CWS, the first device is expected to obtain the HARQ-ACK corresponding to the data packet on the reference time unit from a perspective of the HARQ feedback time sequence or a HARQ feedback capability. For example, if the first device sends a data packet on a slot #n (#n represents an $n^{th}$ slot, and n is a natural number; this is the same or similar in the following, and details are not further described), the first device may indicate the second device to feed back, on a slot #n+k (k is a positive integer), a HARQ-ACK corresponding to the data packet on the reference time unit. Alternatively, based on a feedback latency predefined or configured by the access network device or a feedback capability of the second device, the second device is capable of feeding back, on a slot #n+a (a is a natural number), a HARQ-ACK corresponding to the data packet on the reference time unit; or the second device needs to feed back, on a slot #n+a (a is a natural number), a HARQ-ACK corresponding to the data packet on the reference time unit. In this case, the first device may use the slot #n as the reference time unit when determining the CWS after the slot #n+a.

Optionally, when the reference time unit is a downlink reference time unit, the downlink reference time unit determined by the first device is a downlink time unit in a downlink burst (referred to as a first downlink burst) before the first device determines the CWS or performs channel listening. Specifically, the downlink reference time unit is the first downlink time unit in the first downlink burst. Further, the first downlink burst is a latest downlink burst before the CWS is determined or channel listening is performed. Further, the first downlink burst is a (latest) downlink burst in which the first device is expected to obtain a HARQ-ACK corresponding to a data packet on the downlink reference time unit when determining the CWS or performing channel listening. Further, the first downlink burst is a downlink burst in which the first device performs sending through a random backoff CCA access channel.

Optionally, when the reference time unit is an uplink reference time unit, the uplink reference time unit is determined by the first device based on received downlink control information that is used to indicate a HARQ-ACK corresponding to an uplink data packet. Specifically, the uplink reference time unit is an uplink time unit in an uplink burst (referred to as a first uplink burst) before a time unit (for example, a downlink time unit that carries the downlink control information) on which the first device receives the downlink control information. Specifically, the uplink reference time unit is the first uplink time unit in the first uplink burst. In addition, the first uplink burst is an uplink burst in which the first device performs sending by accessing a channel through random backoff CCA. In addition, the reference time unit is a time unit on which the first device sends an uplink-shared channel (UL-SCH).

Optionally, the first uplink burst is a latest uplink burst before the downlink time unit that carries the downlink control information.

Optionally, the first uplink burst is a latest uplink burst before a target time unit, and a time interval between the target time unit and the downlink time unit that carries the downlink control information is a first time interval. For example, if the downlink control information is an uplink grant UL grant (or uplink downlink control information (UT, DCI)), a downlink time unit on which the UL grant is received is a slot #n, and the first time interval is b (b is a natural number) slots, a second uplink burst is a latest uplink burst before a slot #n-b.

Optionally, the reference time unit may further include a plurality of nonconsecutive time units, and any one of the plurality of time units is earlier than the moment at which the first device determines the CWS or the moment at which the first device starts channel listening. In other words, the one or more data packets (or the first data packet set, the second data packet set, or the third data packet set described below) are sent by the first device on different time units.

Optionally, that the first device determines a contention window size of the first subband based on the one or more HARQ-ACKs includes:

determining, by the first device, the contention window size of the first subband based on one or more HARQ states for the first subband that correspond to the one or more data packets, where the contention window size of the first subband is determined based on one of the following information:

a proportion of a NACK in the one or more HARQ states for the first subband that correspond to the one or more data packets; or a proportion of an ACK in the one or more HARQ states for the first subband that correspond to the one or more data packets; or a quantity of NACKs in the one or more HARQ states for the first subband that correspond to the one or more data packets; or a quantity of ACKs in the one or more HARQ states for the first subband that correspond to the one or more data packets; or whether a HARQ state, for the first subband, corresponds to the one data packet is a NACK; or whether a HARQ state, for the first subband, that corresponds to the one data packet is an ACK, where the one or more HARQ states for the first subband that correspond to the one or more data packets are represented by the one or more HARQ-ACKs.

Optionally, the contention window size of the first subband is determined based on the one or more HARQ states for the first subband that correspond to the one or more data packets, or the contention window size of the first subband may be determined based on whether there is at least one ACK in the HARQ states for the first subband that correspond to the one or more data packets, or whether there is at least one NACK in the HARQ states for the first subband that correspond to the one or more data packets.

It should be understood that any one of the one or more HARQ states for the first subband that correspond to the one or more data packets includes an ACK or a NACK. Optionally, one of the one or more HARQ states for the first subband that correspond to the one or more data packets may be one of the one or more HARQ-ACKs. For example, a HARQ state, for the first subband, that corresponds to one of the one or more data packets is equivalent to a HARQ-ACK corresponding to the data packet (for example, Embodiment 1 and Embodiment 6). Optionally, one of the one or more HARQ states for the first subband that correspond to the one or more data packets may alternatively be converted from at least one of the one or more HARQ-ACKs. A conversion method of one data packet that is in the one or more data packets and that occupies the first subband is as follows: For example, when a HARQ-ACK corresponding to the data packet is an ACK, a HARQ state, for the first subband, that corresponds to the data packet is an ACK, and when a HARQ-ACK corresponding to the data packet is a HACK, a HARQ state, for the first subband, that corresponds to the data packet is a NACK. For another example, when a HARQ-ACK corresponding to the data packet is DTX, during determining of the contention window size of the first subband, a HARQ state, for the first subband, that corresponds to the data packet is ignored, or a HARQ-ACK corresponding to the data packet is ignored. For another example, when a HARQ-ACK corresponding to the data packet is DTX, a HARQ state, for the first subband, that corresponds to the data packet is a NACK. For another example, the data packet corresponds to a plurality of CBG HARQ-ACKs, and the first device converts the plurality of CBG HARQ-ACKs into one HARQ state for the first subband (for example, Embodiment 2, Embodiment 3, and Embodiment 4).

Optionally, each of the one or more data packets has one HARQ state for the first subband. Specifically, if the one or more data packets are m (m is a positive integer) data packets, the first device determines the contention window size of the first subband based on m HARQ states for the first subband that correspond to the m data packets. For example, in the m HARQ states, when a proportion of a NACK exceeds a first preset proportion, or a proportion of an ACK does not exceed a second preset proportion, or a quantity of NACKs exceeds a first preset threshold, or a quantity of an ACK does not exceed a second preset threshold, or there is no ACK, the contention window size of the first subband is to be increased. For another example, in the m HARQ states, when a proportion of a NACK does not exceed the first preset proportion, or a proportion of an ACK exceeds the second preset proportion, or a quantity of NACKs does not exceed the first preset threshold, or a proportion of an ACK exceeds the second preset threshold, or there is at least one ACK, the contention window size of the first subband is to be decreased. For another example, the one or more data packets are one data packet, and when a HARQ state, for the first subband, that corresponds to the data packet is a NACK, the contention window size of the first subband is to be increased. For another example, the one or more data packets are one data packet, and when a HARQ state, for the first subband, that corresponds to the data packet is an ACK, the contention window size of the first subband is to be decreased.

In addition, the foregoing method is also applicable when the first device determines a contention window size of a subband (for example, the second subband, the third subband, or the fourth subband) based on a HARQ state, for the subband, that corresponds to a data packet set (for example, the first data packet set, the second data packet set, or the third data packet set).

It should be understood that after the first device determines the contention window size of the first subband based on the one or more HARQ-ACKs, the first device performs channel listening on the first subband based on the CWS of the first subband. Specifically, the first device performs random backoff CCA on the first subband. A specific listening procedure is described above, and details are not described again. In addition, the foregoing description is also applicable to the following description: The first device performs channel listening on the second subband based on a CWS of the second subband, the first device performs channel listening on the third subband based on a CWS of the third subband, the first device performs channel listening on the fourth subband based on a CWS of the fourth subband, and the first device performs channel listening on the fifth subband based on a CWS of the fifth subband.

The first device may adjust a CWS of a subband based on the one or more HARQ-ACKs corresponding to the one or more data packets in the following several manners.

Embodiment 1

The one or more subbands include the first subband and the second subband, the one or more data packets include the first data packet, the first data packet is carried on a plurality of subbands (namely, at least two subbands) including the first subband, and the one or more HARQ-ACKs include a TB HARQ-ACK for a transport block TB corresponding to the first data packet. The first device determines the CWS of the first subband based on the TB HARQ-ACK.

In this embodiment of this disclosure, when the first data packet sent by the first device is a wideband data packet that occupies at least two subbands, one second device may feed back one HARQ-ACK for the data packet. In other words, the one or more HARQ-ACKs are one TB HARQ-ACK, and the TB HARQ-ACK is referred to as a wideband HARQ-ACK, a TB acknowledgement (TB-ACK), or a TB HARQ-ACK.

Although the first device receives the TB HARQ-ACK, because a frequency domain granularity for LBT specified in a protocol or a regulation is a subband granularity, to facilitate adaptive adjustment of a data sending bandwidth, as described in the foregoing disadvantage, the first device may not perform wideband channel listening (for example, for an 80 MHz wideband data packet, a frequency domain range in which the first device performs LBT is also 80 MHz), but perform subband channel listening (for example, for an 80 MHz wideband data packet, the first device independently performs LBT on each 20 MHz subband). In this way, access efficiency of a wideband channel is improved. In this case, a frequency domain range corresponding to the TB HARQ-ACK is greater than a frequency domain range for channel listening. In an example of the first subband included in the one or more subbands, the first device adjusts the CWS of the first subband based on the TB HARQ-ACK corresponding to the wideband data packet.

Optionally, the HARQ-ACK is a TB HARQ-ACK for a transport block TB corresponding to the data packet, and one data packet corresponds to one TB HARQ-ACK. When the second device performs HARQ feedback on a TB, one TB or one data packet corresponds to one TB HARQ-ACK, namely, one TB-ACK. In other words, the wideband data packet on the at least two subbands corresponds to only one ACK, one NACK, or one DTX, and the first device adjusts a CWS of a subband based on the TB-ACK.

Optionally, a manner in which the first device adjusts the first subband based on the TB HARQ-ACK corresponding to the first data packet is as follows: When the TB HARQ-ACK is an ACK, a HARQ state, for the first subband, that corresponds to the first data packet is an ACK, or when the TB HARQ-ACK is a NACK, a HARQ state, for the first subband, that corresponds to the first subband is a NACK.

Further, when the TB HARQ-ACK is DTX, the TB HARQ-ACK is denoted as a NACK, and is used to determine the CWS of the first subband (to be specific, the HARQ state, for the first subband, that corresponds to the first data packet is a NACK), or the HARQ-ACK is ignored during adjusting of the CWS of the first subband.

Further, the first device further determines a CWS of the second subband based on the TB HARQ-ACK, and the second subband is included in the at least two subbands that carry the first data packet. The first device performs channel listening on the second subband based on the CWS of the second subband.

Considering that the first data packet is carried on the at least two subbands, the first data packet occupies at least the second subband in addition to the first subband. In this case, because a channel state of the second subband also contributes to the TB HARQ-ACK, the TB HARQ-ACK is also used to adjust the CWS of the second subband. For example, when the TB HARQ-ACK is ACK/NACK/DTX, the ACK/NACK/DTX state is not only used to adjust the CWS of the first subband, but also used to adjust the CWS of the second subband. Specifically, a HARQ state, for the second subband, that corresponds to the first data packet is represented by the TB HARQ-ACK. Specifically, the first device determines the CWS of the second subband based on the HARQ state, for the second subband, that corresponds to the first data packet. This is similar to a manner of determining the CWS of the first subband based on the HARQ state, for the first subband, that corresponds to the first data packet.

To be specific, that the first device further determines the contention window size of the second subband based on the TB HARQ-ACK includes: further determining, by the first device, the contention window size of the second subband based on the HARQ state, for the second subband, that corresponds to the first data packet, where when the TB HARQ-ACK is an ACK, the HARQ state, for the second subband, that corresponds to the first data packet is an ACK; or when the TB HARQ-ACK is a NACK, the HARQ state, for the second subband, that corresponds to the first data packet is a NACK.

The determining, by the first device, the contention window size of the second subband based on the HARQ state, for the second subband, that corresponds to the first data packet includes: determining, by the first device, the contention window size of the second subband based on a HARQ state, for the second subband, that corresponds to a data packet in the first data packet set, where the first data packet set includes at least one data packet that is sent by the first device on the reference time unit and that occupies the second subband, and the first data packet set includes the first data packet. The contention window size of the second subband is determined based on one of the following information: a proportion of a NACK to the HARQ state, for the second subband, that corresponds to the data packet in the first data packet set; or a proportion of an ACK to the HARQ state, for the second subband, that corresponds to the data packet in the first data packet set; or a quantity of NACKs in the HARQ state, for the second subband, that corresponds to the data packet in the first data packet set; or a quantity of ACKs in the HARQ state, for the second subband, that corresponds to the data packet in the first data packet set; or whether the HARQ state, for the second subband, that corresponds to the data packet in the first data packet set is a NACK; or whether the HARQ state, for the second subband, that corresponds to the data packet in the first data packet set is an ACK. The HARQ state, for the second subband, that corresponds to the data packet in the first data packet set is represented by one or more HARQ-ACKs corresponding to the data packet in the first data packet set.

Further, the data packet in the first data packet set is all data packets in the first data packet set.

Further, the first data packet set includes all data packets that are sent by the first device on the reference time unit and that occupy the second subband.

Specifically, the data packet in the first data packet set includes a data packet sent by the first device to one or more receiving devices. This is similar to that the first device sends the one or more data packets to the one or more second devices.

Specifically, the one or more HARQ-ACKs corresponding to the data packet in the first data packet set are one or more HARQ-ACKs fed back by the one or more receiving devices, and are similar to the one or more HARQ-ACKs that are fed back by the one or more second devices and that correspond to the one or more data packets. The one or more receiving devices and the one or more second devices may be a same set, or may be different sets.

It should be understood that a correspondence between a data packet in the first data packet set and a HARQ-ACK corresponding to the data packet in the first data packet set herein is similar to a correspondence between the one or more HARQ-ACKs and the one or more data packets: any data packet in the first data packet set may correspond to one or more HARQ-ACKs.

Optionally, the contention window size of the second subband is determined based on the HARQ state, for the second subband, that corresponds to the first data packet, or the contention window size of the second subband may be determined based on whether there is at least one ACK in the HARQ state, for the second subband, that corresponds to the data packet in the first data packet set, or whether there is at least one HACK in the HARQ state, for the second subband, that corresponds to the data packet in the first data packet set.

Figure 8:
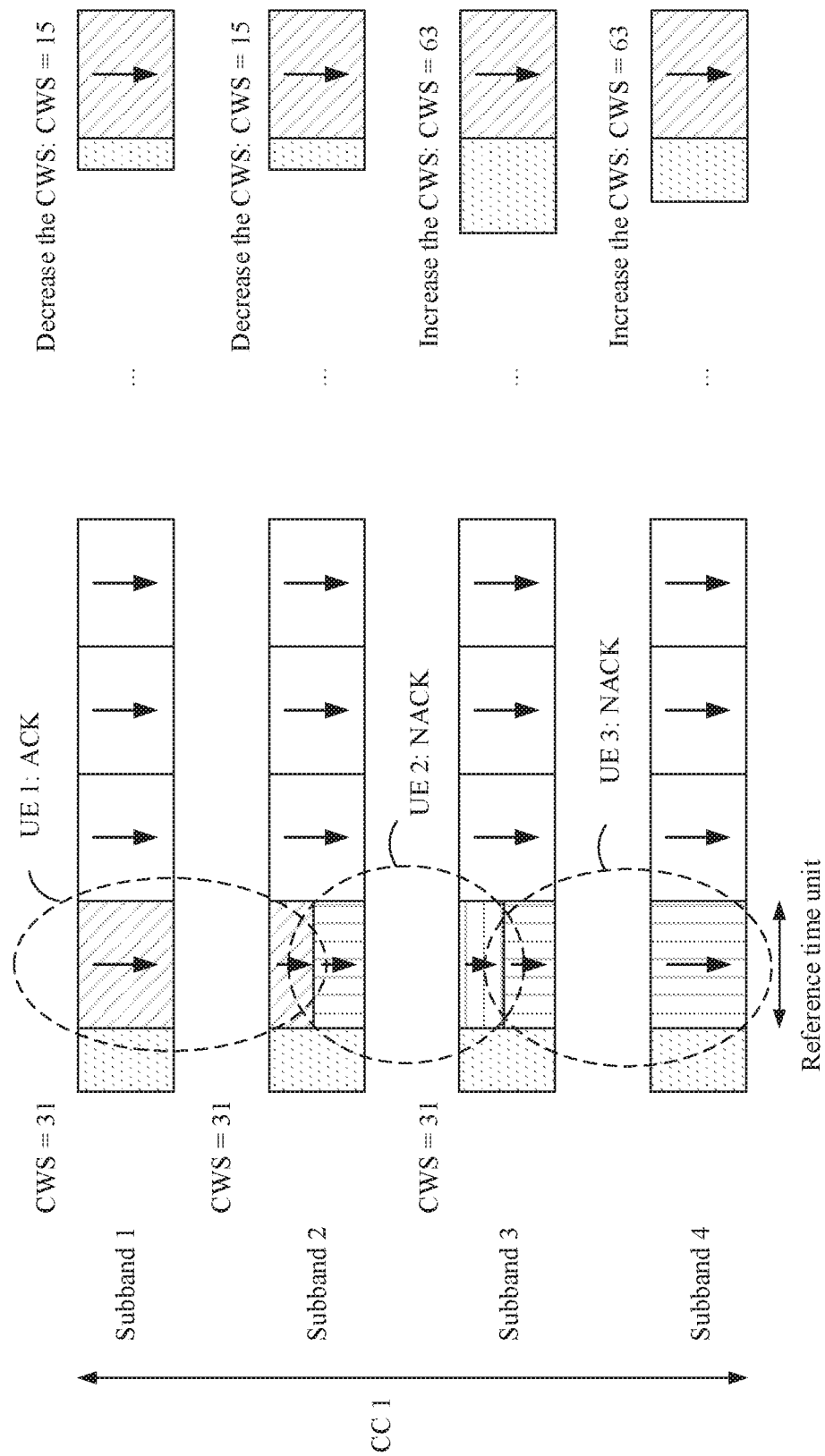
FIG. 8 is a schematic diagram of downlink CWS adjustment according to an embodiment of this disclosure.

It should be understood that the second subband is any subband other than the first subband in the at least two subbands. In other words, the first device determines a CWS of each of the at least two subbands based on the TB HARQ-ACK. The first device performs channel listening on a corresponding subband based on the CWS of each subband. For example, for an $i^{th}$ subband ($i=1, \ldots, I$, where $I$ is a total quantity of subbands in the at least two subbands, and both i and I are natural numbers) in the at least two subbands, the first device adjusts a CWS of the subband based on the TB HARQ-ACK. In other words, the TB HARQ-ACK is used to adjust the CWS of the $i^{th}$ subband. Specifically, a HARQ state, for the $i^{th}$ subband, that corresponds to the first data packet is represented by the TB HARQ-ACK. Specifically, the first device determines the CWS of the subband based on the HARQ state, for the subband, that corresponds to the first data packet. This is similar to a manner of determining the CWS of the first subband based on the HARQ state, for the first subband, that corresponds to the first data packet. For example, in FIG. 8, a downlink data packet used by an access network device to schedule UE 1 is carried on a subband 1 and a subband 2, a downlink data packet used to schedule UE 2 is carried on the subband 2 and a subband 3, and a downlink data packet used to schedule UE 3 is carried on the subband 3 and a subband 4. The access network device adjusts a CWS of a subband based on a proportion of a NACK in a HARQ state, for the subband, corresponding to a data packet. A HARQ-ACK, corresponding to the downlink data packet, from the UE 1 is an ACK, a HARQ-ACK, corresponding to the downlink data packet, from the UE 2 is a NACK, and a HARQ-ACK, corresponding to the downlink data packet, from the UE 3 is a NACK. ATB HARQ-ACK from the UE 1 that is an ACK state is included in each of HARQ state sets for the subband 1 and the subband 2 and participates in adjusting each of CWSs of the subband 1 and the subband 2, a TB HARQ-ACK from the UE 2 that is a NACK state is included in each of HARQ state sets for the subband 2 and the subband 3 and participates in adjusting each of CWSs of the subband 2 and the subband 3. For the subband 1, the HARQ state set for the subband 1 includes one ACK (from the UE 1), and a proportion of a NACK is 0% and is less than a preset proportion 80%. Therefore, the access network device decreases the CWS of the subband 1. For the subband 2, the HARQ state set for the subband 2 includes one ACK (from the UE 1) and one NACK (from the UE 2), and a proportion of a NACK is 50% and is less than the preset proportion 80%. Therefore, the access network device decreases the CWS of the subband 2. For the subband 3, the HARQ state set for the subband 3 includes two NACKs (from the UE 2 and the UE 3), and a proportion of a NACK is 100% and is greater than the preset proportion 80%. Therefore, the access network device increases the CWS of the subband 3. For the subband 4, a HARQ state set for the subband 4 includes one NACK (from the UE 3), and a proportion of a NACK is 100% and is greater than the preset proportion 80%. Therefore, the access network device increases a CWS of the subband 4.

Figure 9:
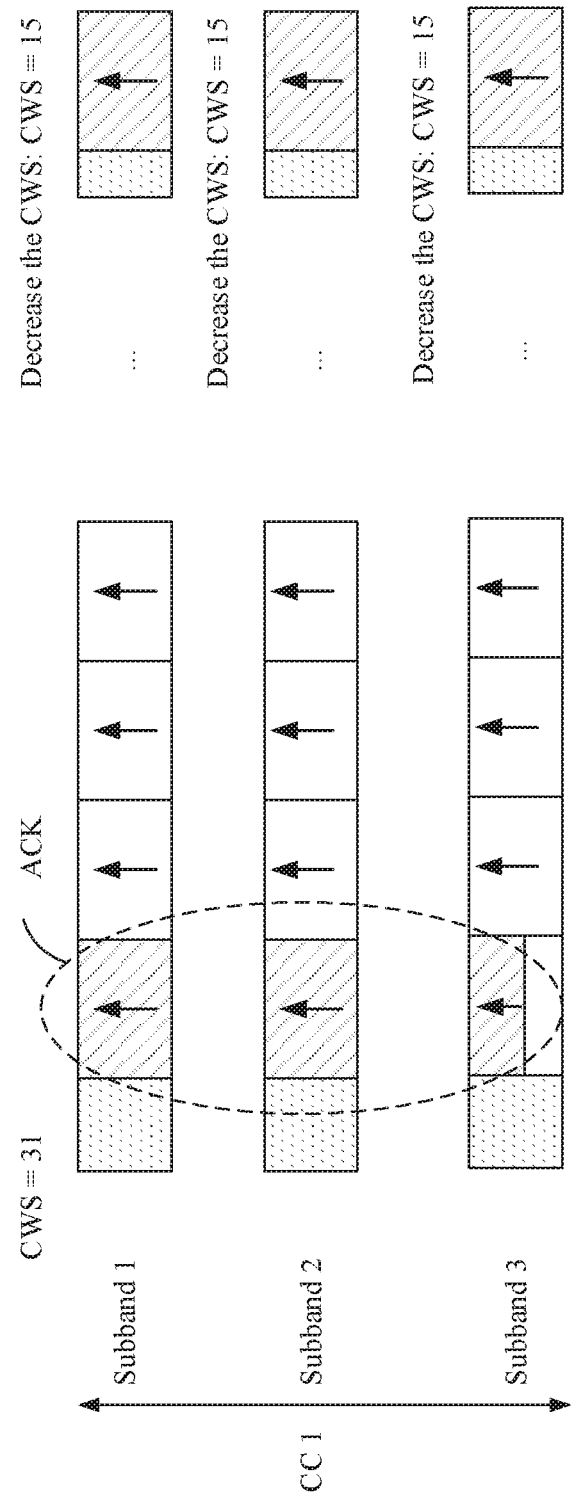
FIG. 9 is a schematic diagram of uplink CWS adjustment according to an embodiment of this disclosure.

For example, in FIG. 9, the terminal device occupies a subband 1, a subband 2, and a subband 3 to send an uplink data packet. If a TB HARQ-ACK corresponding to the uplink data packet is an ACK, the terminal device separately reduces CWSs of the sub band 1, the subband 2, and the subband 3 based on the ACK.

In the method in this embodiment of this disclosure, the first device adjusts the CWS of each of the at least two subbands based on the TB HARQ-ACK that is fed back by the one or more second devices for the wideband data packet, and the TB HARQ-ACK is repeatedly used to adjust the CWS of each of the at least two subbands. A channel state of each of the at least two subbands contributes to the TB HARQ-ACK. For example, when the wideband data packet is correctly received by the second device, the TB HARQ-ACK reflects that the at least two subbands on which the wideband data packet is located all have relatively good channel quality. Therefore, the first device can decrease the CWS of each of the at least two subbands, to improve efficiency of next channel access. When channel quality of a subband deteriorates because the first device collides with another adjacent node on the subband, and the wideband data packet cannot be correctly received by the second device, the TB HARQ-ACK reflects that the at least two subbands include a subband with poor channel quality. Therefore, the first device increases the CWS of each of the at least two subbands, to reduce a collision probability during next transmission.

In the method in this embodiment of this disclosure, because the TB HARQ-ACK corresponds to the wideband data packet, compared with the prior art in which a subband. HARQ-ACK is fed back for a data packet on each subband, uplink feedback overheads can be reduced. Therefore, according to this embodiment of this disclosure, a CWS of a subband can be accurately adjusted without increasing HARQ-ACK feedback overheads, to implement friendly coexistence with an adjacent node that operates on a same unlicensed spectrum.

Embodiment 2

In the method provided in this embodiment, the one or more data packets include the second data packet, the second data packet is carried on the first subband, and the second data packet includes one or more code block groups CBGs. Alternatively, the second data packet is consisted of the one or more CBGs. The second device feeds back a HARQ-ACK at a granularity of CBG. In this case, the one or more HARQ-ACKs fed back by the second device for the second data packet include one or more CBG HARQ-ACKs corresponding to the one or more code block groups, and the one or more HARQ-ACKs are also referred to as one or more CBG-ACKs. In this embodiment, the second data packet is a subband data packet, and the one or more CBG-ACKs may be converted into one TB-ACK and is used to adjust the CWS of the first subband. In other words, when the first device adjusts the CWS of the first subband, the one or more CBG HARQ-ACKs are denoted as one HARQ state (for example, a first HARQ state, where the first HARQ state is a HARQ state corresponding to the second data packet and the first subband), and are used to determine the CWS of the first subband.

Optionally, the one or more code block groups are all code block groups included in the second data packet.

Further, the one or more code block groups are a plurality of code block groups.

Specifically, as described above, when a HARQ-ACK corresponding to any CBG in the second data packet is a NACK (or DTX), it indicates that the second data packet is not correctly received. It indicates that the second data packet is correctly received only when HARQ-ACKs corresponding to all the CBGs in the second data packet are ACKs. Therefore, a convention manner is as follows:

When the one or more CBG HARQ-ACKs are all ACKs, a HARQ state, for the first subband, that corresponds to the second data packet is an ACK; or when the one or more CBG HARQ-ACKs include one or more NACKs, a HARQ state, for the first subband, that corresponds to the second data packet is a NACK.

Further, when the one or more CBG HARQ-ACKs are all DTX, the HARQ state; for the first subband, that corresponds to the second data packet is denoted as a NACK, and is used to determine the CWS of the first subband (in other words, the HARQ state, for the first subband, that corresponds to the second data packet is a NACK), or the one or more HARQ-ACKs are ignored during adjusting of the CWS of the first subband.

It should be understood that the one or more CBGs correspond to the one or more CBG HARQ-ACKs in the following several specific correspondence manners:

1. Each of the one or more CBG HARQ-ACKs corresponds to one of the one or more CBGs, or the one or more CBG HARQ-ACKs one-to-one correspond to the one or more CBGs.

2. One of the one or more CBG HARQ-ACKs corresponds to at least two of the one or more CBGs.

3. One of the one or more CBGs corresponds to at least two of the one or more CBG HARQ-ACKs.

It should be understood that the one or more CBGs include at least two CBGs. In other words, there are at least two CBG-ACKs. When the second data packet includes at least two CBGs, and the HARQ-ACKs fed back by the second device are CBG-ACKs, the first device considers that the at least two CBG-ACKs equal to one TB-ACK, and uses the TB-ACK to adjust the CWS of the first subband. This is a difference between this disclosure and the prior art (the HARQ-ACK fed back by the second device is a TB-ACK, and the first device directly uses the TB-ACK to adjust the CWS).

Further, the second data packet is carried on at least the first subband and a third subband, and the first device further determines a contention window size of the third subband based on the one or more CBG HARQ-ACKs.

Optionally, that the first device further determines a contention window size of the third subband based on the one or more CBG HARQ-ACKs includes: further determining, by the first device, the contention window size of the third subband based on a HARQ state, for the third subband, that corresponds to the second data packet, where when the one or more CBG-acknowledgements are all ACKs, the HARQ state, for the third subband, that corresponds to the second data packet is an ACK; or when the one or more CBG-acknowledgements include one or more NACKs, the HARQ state, for the third subband, that corresponds to the second data packet is a NACK.

Further, when the one or more CBG HARQ-ACKs are all DTX, the HARQ state, for the third subband, that corresponds to the second data packet is denoted as a NACK, and is used to determine the CWS of the first subband (in other words, the HARQ state, for the first subband, that corresponds to the second data packet is a NACK), or the HARQ state, for the third subband, that corresponds to the second data packet is ignored during adjusting of the CWS of the third subband.

Figure 10A:
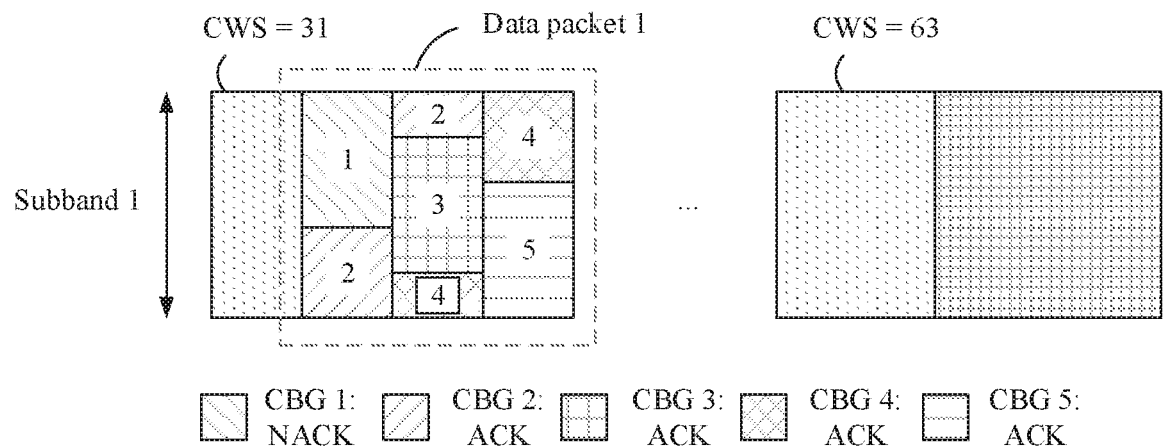
FIG. 10(a) and FIG. 10(b) are a schematic diagram of CWS adjustment according to an embodiment of this disclosure.
Figure 10B:
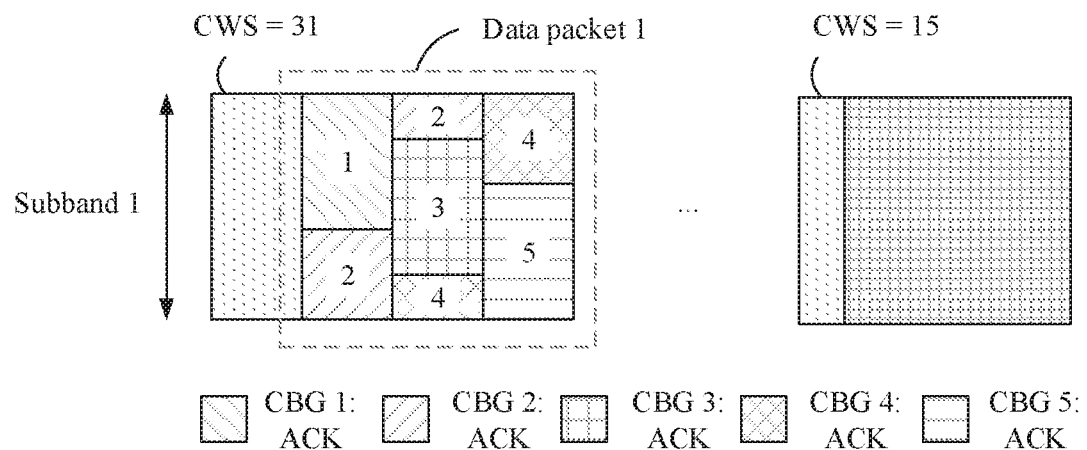

For example, in FIG. 10(a) and FIG. 10(b), the first device sends a data packet 1 on the reference time unit, and does not send another data packet. The data packet 1 includes a CBG 1 to a CBG 5, and the CBG 1 to the CBG 5 are one-to-one correspond to five CBG HARQ-ACKs fed back by the second device. In FIG. 10(a), a CBG HARQ-ACK of the CBG 1 is a NACK, and CBG HARQ-ACKs of the CBG 2 to the CBG 5 are all ACKs. In this case, the first device converts the five CBG-ACKs into one NACK, and uses the NACK as a HARQ state, for the first subband, that corresponds to the data packet 1, to adjust the CWS of the first subband, to increase the CWS of the first subband. In FIG. 10(b), the CBG HARQ-ACKs of the CBG 1 to the CBG 5 are all ACKs. In this case, the first device converts the five CBG-ACKs into one ACK, and uses the ACK as a HARQ state corresponding to the data packet 1, to adjust the CWS of the first subband, to decrease the CWS of the first subband.

In the method in this embodiment of this disclosure, on one hand, when the first device is an access network device and the second device is a terminal device, the access network device may schedule a plurality of terminal devices during downlink transmission, some terminal devices (for example, the second device) feed back CBG-ACKs, and the other terminal devices feed back TB-ACKs. For the terminal devices that feed back CBG-ACKs, a plurality of CBG-ACKs may be fed back for one data packet (TB). For the terminal devices that feed back TB-ACKs, one TB-ACK is fed back for one data packet (TB). How to adjust a CWS based on two different types of HARQ-ACKs requires additional evaluation and standardization, and this also increases algorithm complexity of the access network device. The CBG-ACKs fed back by the terminal devices that feed back CBG-ACKs are converted into a TB-ACK, and the CWS is adjusted uniformly based on a proportion of a NACK or an ACK in the TB-ACK. This may be more adaptive to a conventional CWS adjustment principle, and an algorithm is also simpler.

On the other hand, if the CWS is adjusted directly based on a proportion of a NACK or an ACK in HARQ-ACKs or whether there is an ACK in the HARQ-ACKs regardless of types of the HARQ-ACKs, when channel states are the same, a proportion of a NACK obtained in this method is lower than that in a conventional CWS adjustment method (for example, the terminal devices all feed back TB-ACKs, and the access network device always adjusts the CWS based on the TB-ACKs). If the CWS is still adjusted based on an existing preset proportion of a NACK or an ACK, the CWS is relatively small. This does not facilitate friendly coexistence. However, according to this embodiment of this disclosure, in a same case, the proportion of a NACK or an ACK obtained is consistent with that in the conventional CWS adjustment method, and this better facilitates friendly coexistence with a surrounding node.

If a data packet is carried on a wideband, and a HARQ-ACK is a CBG-acknowledgement, the first device adjusts a CWS of a subband based on the CBG-acknowledgement. In the method provided in this embodiment of this disclosure, a data packet is carried on at least two subbands, the data packet includes one or more CBGs, and the second device feeds back a HARQ-ACK at a granularity of CBG. In other words, the HARQ-ACK fed back by the second device is a CBG-ACK. In other words, the first device determines the CWS of the subband based on the CBG-ACK corresponding to the data packet. Two methods in Embodiment 3 and Embodiment 4 may be included, and are specifically described below.

Embodiment 3

In the method provided in this embodiment of this disclosure, the one or more data packets include the second data packet, the second data packet is carried on the plurality of subbands (namely, at least two subbands) including the first subband, and the second data packet includes one or more code block groups CBGs. The one or more HARQ-ACKs include one or more CBG HARQ-ACKs corresponding to the one or more code block groups.

The second data packet includes the one or more code block groups. In other words, the one or more code block groups include all code block groups included in the second data packet.

Further, the one or more code block groups are a plurality of code block groups.

In this embodiment of this disclosure, the second data packet is a wideband data packet, the one or more HARQ-ACKs fed back by the second device for the second data packet are HARQ-ACKs for the one or more CBGs, and the one or more HARQ-ACKs are referred to as one or more CBG-ACKs. The first device may convert the one or more CBG-ACKs into one TB-ACK, and uses the TB-ACK to adjust the CWS of the first subband. In other words, when the first device adjusts the CWS of the first subband, the one or more HARQ-ACKs are denoted as one HARQ state used to determine the CWS of the first subband. In this case, a frequency domain range corresponding to the TB-ACK obtained through conversion is greater than a frequency domain range for channel listening. In an example of the first subband included in the one or more subbands, the first device adjusts the CWS of the first subband based on the TB-ACK obtained through conversion.

Specifically, similar to the conversion method in Embodiment 2, the one or more CBG HARQ-ACKs are converted into one TB-ACK corresponding to the second data packet, and the TB-ACK is used as a HARQ state, for the first subband, that corresponds to the second data packet, to adjust the CWS of the first subband.

When the one or more CBG HARQ-ACKs are all ACKs, the HARQ state, for the first subband, that corresponds to the second data packet is an ACK; or when the one or more CBG HARQ-ACKs include one or more NACKs, the HARQ state, for the first subband, that corresponds to the second data packet is a NACK.

Further, when the one or more CBG HARQ-ACKs are all DTX, the HARQ state, for the first subband, that corresponds to the second data packet is denoted as a NACK, and is used to determine the CWS of the first subband (in other words, the HARQ state, for the first subband, that corresponds to the second data packet is a NACK), or the HARQ state, for the first subband, that corresponds to the second data packet is ignored during adjusting of the CWS of the first subband (in other words, the one or more CBG HARQ-ACKs are ignored).

Further, the first device performs channel listening on a third subband based on a CWS of the third subband.

Considering that the second data packet is carried on the at least two subbands, the second data packet occupies at least another subband other than the first subband, and the another subband is referred to as the third subband. A channel state of the third subband also contributes to the one or more CBG HARQ-ACKs. Therefore, the TB-ACK converted from the one or more CBG HARQ-ACKs may also be used to adjust the CWS of the third subband. Specifically, a HARQ state, for the third subband, that corresponds to the second data packet is also represented by the one or more CBG HARQ-ACKs. Specifically, the first device determines the CWS of the third subband based on the HARQ state, for the third subband, that corresponds to the second data packet. This is similar to a manner of determining the CWS of the first subband based on the HARQ state, for the first subband, that corresponds to the second data packet.

Further, that the first device further determines the contention window size of the third subband based on the one or more CBG HARQ-ACKs includes: further determining, by the first device, the contention window size of the third subband based on the HARQ state, for the third subband, that corresponds to the second data packet, where when the one or more CBG-acknowledgements are all ACKs, the HARQ state, for the third subband, that corresponds to the second data packet is an ACK; or when the one or more CBG-acknowledgements include one or more NACKs, the HARQ state, for the third subband, that corresponds to the second data packet is a NACK.

Optionally, the further determining, by the first device, the contention window size of the third subband based on the HARQ state, for the third subband, that corresponds to the second data packet includes: determining, by the first device, the contention window size of the third subband based on a HARQ state, for the third subband, that corresponds to a data packet in a second data packet set, where the second data packet set includes at least one data packet that is sent by the first device on the reference time unit and that occupies the third subband, and the second data packet set includes the second data packet. The contention window size of the third subband is determined based on one of the following information: a proportion of a NACK to the HARQ state, for the third subband, that corresponds to the data packet in the second data packet set; or a proportion of an ACK to the HARQ state, for the third subband, that corresponds to the data packet in the second data packet set; or a quantity of NACKs in the HARQ state, for the third subband, that corresponds to the data packet in the second data packet set; or a quantity of ACKs in the HARQ state, for the third subband, that corresponds to the data packet in the second data packet set; or whether the HARQ state, for the third subband, that corresponds to the data packet in the second data packet set is a NACK; or whether the HARQ state, for the third subband, that corresponds to the data packet in the second data packet set is an ACK. The HARQ state, for the third subband, that corresponds to the data packet in the second data packet set is represented by one or more HARQ-ACKs corresponding to the data packet in the second data packet set.

Further, the data packet n the second data packet set is all data packets in the second data packet set.

Further, the second data packet set includes all data packets that are sent by the first device on the reference time unit and that occupy the third subband.

Specifically, the data packet in the second data packet set includes one or more data packets sent by the first device to one or more receiving devices. This is similar to that the first device sends the one or more data packets to the one or more second devices.

Specifically, the one or more HARQ-ACKs corresponding to the data packet in the second data packet set are one or more HARQ-ACKs fed back by the one or more receiving devices, and are similar to the one or more HARQ-ACKs that are fed back by the one or more second devices and that correspond to the one or more data packets. The one or more receiving devices and the one or more second devices may be a same set, or may be different sets.

It should be understood that a correspondence between a data packet in the second data packet set and a HARQ-ACK corresponding to the data packet in the second data packet set herein is similar to a correspondence between the one or more HARQ-ACKs and the one or more data packets: any data packet in the second data packet set may correspond to one or more HARQ-ACKs.

Optionally, the contention window size of the third subband is determined based on the HARQ state, for the third subband, that corresponds to the second data packet, or the contention window size of the second subband may be determined based on whether there is at least one ACK in the HARQ state, for the third subband, that corresponds to the data packet in the second data packet set, or whether there is at least one NACK in the HARQ state, for the third subband, that corresponds to the data packet in the second data packet set.

It should be understood that the third subband is any subband other than the first subband in the at least two subbands. In other words, the first device determines a CWS length of each of the at least two subbands based on the one or more CBG HARQ-ACKs. The first device performs channel listening on a corresponding subband based on the CWS of each subband. For example, for an subband ($i=1, \ldots, I$, where I is a quantity of subbands in the at least two subbands) in the at least two subbands, the first device adjusts a CWS of the subband after converting the one or more CBG HARQ-ACKs, or repeatedly uses the one or more HARQ-ACKs to adjust a CWS of each of the I subbands after converting the one or more HARQ-ACKs. Specifically, a HARQ state, for the $i^{th}$ subband, that corresponds to the second data packet is represented by the one or more CBG HARQ-ACKs. Specifically, the first device determines the CWS of the third subband based on the HARQ state, for the $i^{th}$ subband, that corresponds to the second data packet. This is similar to a manner of determining the CWS of the first subband based on the HARQ state, for the first subband, that corresponds to the second data packet.

Specifically, similar to a method in which the first device converts the one or more HARQ-ACKs (CBG-ACK) into the TB-ACK corresponding to the second data packet to adjust the CWS of the first subband, the TB-ACK obtained through conversion is further used as a HARQ state, for the third subband/the $i^{th}$ subband, that corresponds to the second data packet, to adjust CWS of the third subband/the $i^{th}$ subband.

When the one or more CBG HARQ-ACKs are all acknowledgments ACKs, the HARQ state, for the first subband, that corresponds to the second data packet is an ACK and is used to determine the CWS of the third subband/the subband.

When the one or more CBG HARQ-ACKs include one or more negative acknowledgments NACKs, the HARQ state, for the first subband, that corresponds to the second data packet is a NACK and is used to determine the CWS of the third subband/the $i^{th}$ subband.

Further, when the one or more CBG HARQ-ACKs are all DTX, the HARQ state, for the first subband, that corresponds to the second data packet is denoted as a NACK, and is used to determine the CWS of the third subband/the subband (in other words, the HARQ state, for the third subband/the $i^{th}$ subband, that corresponds to the second data packet is a NACK), or the one or more CBG HARQ-ACKs are ignored during adjusting of the CWS of the third subband/the $i^{th}$ subband.

It should be understood that the one or more CBGs may correspond to the one or more CBG HARQ-ACKs in the following several specific correspondence manners.

1. Each of the one or more CBG HARQ-ACKs corresponds to one of the one or more CBGs, or the one or more CBG HARQ-ACKs one-to-one correspond to the one or more CBGs.

2. One of the one or more CBG HARQ-ACKs corresponds to at least two of the one or more CBGs.

3. One of the one or more CBGs corresponds to at least two of the one or more CBG HARQ-ACKs. It should be understood that the one or more CBGs include at least two CBGs, and the one or more HARQ-ACKs include at least two HARQ-ACKs, namely, at least two CBG-ACKs. This is a difference between this disclosure and the prior art, and is similar to that described in Embodiment 2. Details are not described again.

Figure 11:
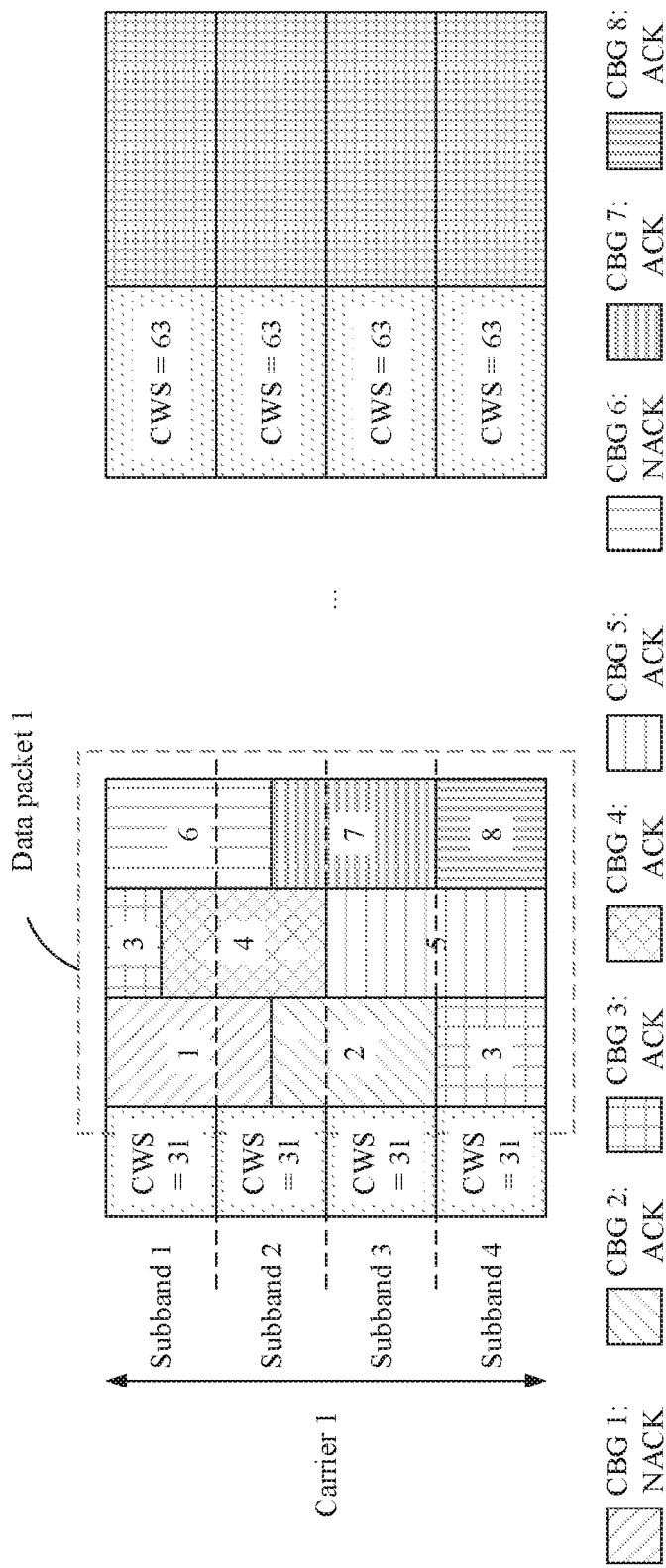
FIG. 11 is a schematic diagram of another CWS adjustment according to an embodiment of this disclosure.

For example, in FIG. 11, a downlink data packet 1 used by an access network device to schedule UE is carried on a subband 1 to a subband 4, and the subband 1 to the subband 4 do not carry another data packet. The data packet 1 includes a CBG 1 to a CBG 8, and the CBG 1 to the CBG 8 one-to-one correspond to eight CBG HARQ-ACKs fed back by the second device. CBG-ACKs corresponding to the CBG 1 and the CBG 6 are NACKs, and CBG-ACKs corresponding to other CBGs are ACKs. Because the eight CBG-ACKs corresponding to the data packet 1 include NACK states, the access network device converts the CBG-ACKs into one NACK state, and uses the NACK state as a HARQ state, for each of the subband 1 to the subband 4, that corresponds to the data packet 1, to adjust CWSs of the subband 1 to the subband 4, to increase the CWSs of the subband 1 to the subband 4.

In this embodiment of this disclosure, similar to Embodiment 2, the CBG-ACKs are converted into a wideband TB-ACK, to adjust a CWS of a subband. This is more adaptive to a conventional CWS adjustment principle, makes an algorithm simpler, and better facilitates friendly coexistence with a surrounding node.

Embodiment 4

In the method provided in this embodiment of this disclosure, a data packet is carried on at least two subbands, the data packet includes one or more CBGs, and the second device feeds hack a HARQ-ACK at a granularity of CBG. In other words, the HARQ-ACK fed back by the second device is a CBG-ACK. The first device determines a CWS of a subband based on a CBG-ACK corresponding to a CBG that is in the one or more CBGs included in the data packet and that occupies the subband. In other words, a CBG-ACK corresponding to a CBG that is in the one or more CBGs included in the data packet and that does not occupy the subband is not used to determine the CWS of the subband.

Specifically, the one or more data packets include the third data packet, the third data packet is carried on a plurality of subbands including the first subband, the third data packet includes a first code block group set, the first code block group set is consisted of one or more code block groups that occupy the first subband, and the one or more HARQ-ACKs include one or more CBG HARQ-ACKs corresponding to one or more code block groups in the first code block group set.

Optionally, the first code block group set includes a plurality of code block groups.

It should be understood that that a code block group set (for example, the first code block group set or a second code block group set) includes one or more code block groups that occupy a subband (for example, the first subband or a fourth subband) means that all code block groups in the code block group set are code block groups that occupy the subband. In other words, the code block group set is a set including all code block groups that are in all code block groups included in the third data packet and that occupy the subband. In other words, the code block group set does not include a CBG that is in the third data packet and that does not occupy the first subband.

Further, for a CBG (referred to as a second CBG) that is included in the third data packet and that does not occupy the first subband, a CBG HARQ-ACK corresponding to the second CBG is not used to adjust the contention window size of the first subband. In other words, the CBG HARQ-ACK corresponding to the second CBG is not used to represent a HARQ state, for the first subband, that corresponds to the third data packet.

Different from the conversion method for converting CBG HARQ-ACKs corresponding to all CBGs included in a data packet into one TB-ACK in Embodiment 2 and Embodiment 3, in this embodiment, a CBG HARQ-ACK corresponding to a code block group (namely, a code block group in the first code block group set) that is in the third data packet and that occupies the first subband is converted into one HARQ state (referred to as a subband-ACK), for the first subband, that corresponds to the third data packet, and is used to adjust the CWS of the first subband.

When the CBG HARQ-ACKs corresponding to the code block groups in the first code block group set are all ACKs, the HARQ state, for the first subband, that corresponds to the third data packet is an ACK; or when the CBG HARQ-ACKs corresponding to the code block groups in the first code block group set include one or more NACKs, the HARQ state, for the first subband, that corresponds to the third data packet is a NACK.

Further, when the CBG HARQ-ACKs corresponding to the code block groups in the first code block group set are all DTX, the HARQ state, for the first subband, that corresponds to the third data packet is denoted as a NACK, and is used to determine the CWS of the first subband (in other words, the HARQ state, for the first subband, that corresponds to the third data packet is a NACK), or the HARQ state, for the first subband, that corresponds to the third data packet is ignored during adjusting of the CWS of the first subband (in other words, the CBG HARQ-ACKs corresponding to the code block groups in the first code block group set are ignored).

Further, the CBG HARQ-ACKs corresponding to the code block groups in the first code block group set include CBG HARQ-ACKs corresponding to all code block groups in the first code block group set.

Specifically, the first code block group set includes a first code block group, the first code block group occupies the first subband and the fourth subband, the third data packet further includes a second code block group set, the second code block group set is consisted of one or more code block groups that occupy the fourth subband, the second code block group set includes the first code block group, and the first device further determines a contention window size of the fourth subband based on a CBG HARQ-ACK corresponding to the first code block group.

Considering that some code block groups included in the third data packet are carried on at least two subbands including the first subband, for example, the first code block group occupies the first subband and the fourth subband, in this case, a channel state of the fourth subband also contributes to the CBG HARQ-ACK corresponding to the first code block group. Therefore, the CBG HARQ-ACK corresponding to the first code block group is also used to adjust the CWS of the fourth subband. Specifically, a HARQ state, for the fourth subband, that corresponds to the third data packet is represented by one or more CBG HARQ-ACKs (including the CBG HARQ-ACK of the first code block group) of the one or more code block groups in the second code block group set. Specifically, the first device determines the CWS of the fourth subband based on the HARQ state, for the fourth subband, that corresponds to the third data packet. This is similar to a manner of determining the CWS of the first subband based on the HARQ state, for the first subband, that corresponds to the third data packet.

Further, the second code block group set includes a plurality of code block groups.

Optional, that the first device further determines a contention window size of the fourth subband based on a CBG HARQ-ACK corresponding to the first code block group includes: further determining, by the first device, the contention window size of the fourth subband based on the HARQ state, for the fourth subband, that corresponds to the third data packet, where when CBG HARQ-ACKs corresponding to the code block groups in the second code block group are all ACKs, the HARQ state, for the fourth subband, that corresponds to the third data packet is an ACK; or when CBG HARQ-ACKs corresponding to the code block groups in the second code block group include one or more NACKs, the HARQ state, for the fourth subband, that corresponds to the third data packet is a NACK.

Further, when the CBG HARQ-ACKs corresponding to the code block groups in the second code block group set are all DTX, the HARQ state, for the fourth subband, that corresponds to the third data packet is denoted as a NACK, and is used to determine the CWS of the fourth subband (in other words, the HARQ state, for the fourth subband, that corresponds to the third data packet is a NACK), or the HARQ state, for the fourth subband, that corresponds to the third data packet is ignored during adjusting of the CWS of the fourth subband (in other words, the CBG HARQ-ACKs corresponding to the code block groups in the second code block group set are ignored).

Further, the CBG HARQ-ACKs corresponding to the code block groups in the second code block group set include CBG HARQ-ACKs corresponding to all the code block groups in the second code block group set.

In a possible implementation, the further determining, by the first device, the contention window size of the fourth subband based on the HARQ state, for the fourth subband, that corresponds to the third data packet includes: determining, by the first device, the contention window size of the fourth subband based on a HARQ state, for the fourth subband, that corresponds to a data packet in the third data packet set, where the third data packet set includes one or more data packets that are sent by the first device on the reference time unit and that occupy the fourth subband, and the third data packet set includes the third data packet. The contention window size of the fourth subband is determined based on one of the following information: a proportion of a NACK to the HARQ state, for the fourth subband, that corresponds to the data packet in the third data packet set; or a proportion of an ACK to the HARQ state, for the fourth subband, that corresponds to the data packet in the third data packet set; or a quantity of NACKs in the HARQ state, for the fourth subband, that corresponds to the data packet in the third data packet set; or a quantity of ACKs in the HARQ state, for the fourth subband, that corresponds to the data packet in the third data packet set; or whether the HARQ state, for the fourth subband, that corresponds to the data packet in the third data packet set is a NACK; or whether the HARQ state; for the fourth subband, that corresponds to the data packet in the third data packet set is an ACK. The HARQ state, for the fourth subband, that corresponds to the data packet in the third data packet set is represented by one or more HARQ-ACKs corresponding to the data packet in the third data packet set.

Optionally, the contention window size of the third subband is determined based on the HARQ state, for the fourth subband, that corresponds to the third data packet, or the contention window size of the second subband may be determined based on whether there is at least one ACK in the HARQ state, for the fourth subband, that corresponds to the data packet in the third data packet set, or whether there is at least one NACK in the HARQ state, for the fourth subband, that corresponds to the data packet in the third data packet set.

Further, the data packet in the third data packet set is all data packets in the third data packet set.

Further, the third data packet set includes all data packets that are sent by the first device on the reference time unit and that occupy the fourth subband.

Specifically, the data packet in the third data packet set includes one or more data packets sent by the first device to one or more receiving devices. This is similar to that the first device sends the one or more data packets to the one or more second devices.

Specifically, the one or more HARQ-ACKs corresponding to the data packet in the third data packet set are one or more HARQ-ACKs fed back by the one or more receiving devices, and are similar to the one or more HARQ-ACKs that are fed back by the one or more second devices and that correspond to the one or more data packets. The one or more receiving devices and the one or more second devices may be a same set, or may be different sets.

It should be understood that a correspondence between a data packet in the third data packet set and a HARQ-ACK corresponding to the data packet in the third data packet set herein is similar to a correspondence between the one or more HARQ-ACKs and the one or more data packets: any data packet in the third data packet set may correspond to one or more HARQ-ACKs.

Optionally, a data packet set (for example, the first data packet set, the second data packet set, or the third data packet set) includes one data packet, including but not limited to the first data packet, the second data packet, or the third data packet described below.

In Embodiment 4 of this embodiment, the HARQ-ACK used to represent the HARQ state, for the first subband, that corresponds to the third data packet is a HARQ-ACK corresponding to the first CBG set carried on the first subband (this is different from Embodiment 3 in which the HARQ-ACK corresponds to the HARQ-ACK corresponding to all CBGs in the third data packet). The first CBG set is a subset of all CBGs included in a data packet carried on the first subband, and a CBG HARQ-ACK corresponding to a code block group in the first CBG set is a subset of all CBG-ACKs fed back by the second device for the third data packet. For example, a data packet is carried on a subband 1 and a subband 2 and includes a CBG 1 to a CBG 4, the CBG 1 and the CBG 2 are carried on the subband 1 (the first subband), and the CBG 3 and the CBG 4 are carried on the subband 2. The first CBG set includes the CBG 1 and the CBG 2. CBG HARQ-ACKs corresponding to the code block groups in the first CBG set are CBG-ACKs corresponding to the CBG 1 and the CBG 2.

Different from Embodiment 3 in which the first device converts only a HARQ-ACK corresponding to the third data packet into a HARQ state, to adjust the CWS of the first subband, in Embodiment 4, the first device converts only one or more HARQ-ACKs (CBG-ACK) corresponding to a CBG that occupies the first subband (or that is mapped to the first subband) in a data packet into a HARQ state, to adjust the CWS of the first subband. In other words, for the at least two subbands occupied by the third data packet, the first device converts a CBG-ACK, corresponding to the third data packet, on each of the at least two subbands into a subband-specific HARQ state (referred to as a subband-ACK), to adjust a CWS of the subband.

Further, the first device further determines the CWS of the fourth subband based on a first HARQ-ACK (or referred to as a first CBG HARQ-ACK) in the one or more CBG HARQ-ACKs. The fourth subband is included in the at least two subbands, the first HARQ-ACK is a HARQ-ACK corresponding to the first CBG, the first CBG is included in the first CBG set, and the first CBG occupies the first subband and the fourth subband. The first device performs channel listening on the fourth subband based on the CWS of the fourth subband.

Similar to that the TB-ACK may be repeatedly used to adjust CWSs of a plurality of subbands, when a CBG (referred to as the first CBG) in the first CBG set is also carried on the fourth subband (the first CBG is a cross-subband CBG), the first HARQ-ACK. (CBG-ACK) corresponding to the first CBG further contributes to adjustment of the CWS of the fourth subband.

It should be understood that the fourth subband is any subband other than the first subband in the subbands occupied by the first CBG. In other words, the first device determines, based on the first HARQ-ACK, a CWS of each of all the subbands occupied by the first CBG, and the first device performs channel listening on a corresponding subband based on the CWS of each subband. For example, for an subband (i=1, ..., I, where I is a quantity of all subbands occupied by the first CBG) in all the subbands occupied by the first CBG, the first device uses the first HARQ-ACK to adjust a CWS of the $i^{th}$ subband, in other words, the first HARQ-ACK is repeatedly used to adjust a CWS of each of the I subbands.

Specifically, similar to that the first device converts the one or more HARQ-ACKs into a HARQ state (referred to as a subband-ACK), for the first subband, that corresponds to the third data packet, to adjust the CWS of the first subband, the first device converts the first HARQ-ACK and a HARQ-ACK corresponding to another CBG that is in the one or more CBGs and that occupies the fourth subband into a HARQ state corresponding to the fourth subband, to adjust the CW of the fourth subband.

The first device determines the CWS of the fourth subband based on a HARQ-ACK corresponding to the second CBG set. The HARQ-ACK corresponding to the second CBG set includes the first HARQ-ACK, the first CBG is further included in the second CBG set, and the second CBG set includes a CBG that is in the one or more CBGs and that occupies the fourth subband.

It should be understood that, when only the first CBG in the data packet that occupies the first subband occupies the fourth subband, the second CBG set includes only the first CBG. When another CBG other than the first CBG in the data packet occupies the fourth subband, the second CBG set includes both the first CBG and the another CBG that occupies the fourth subband.

More specifically, a specific conversion manner of converting, based on the HARQ-ACKs of the code block groups in the second CBG set, a HARQ state, for the fourth subband/the $i^{th}$ subband, that corresponds to the data packet is as follows:

When the CBG HARQ-ACKs corresponding to the code block groups in the second CBG set are all acknowledgments ACKs, the CBG HARQ-ACKs corresponding to the code block groups in the second CBG set are denoted as an ACK and is used to determine a CWS of the fourth subband/the $i^{th}$ subband. In this case, a HARQ state, for the fourth subband/the $i^{th}$ subband, that corresponds to the third data packet may be referred to as an ACK.

When the CBG HARQ-ACKs corresponding to the code block groups in the second CBG set include one or more negative acknowledgments NACKs, the CBG HARQ-ACKs corresponding to the code block groups in the second CBG set are denoted as a NACK and is used to determine a CWS of the fourth subband/the $i^{th}$ subband. In this case, a HARQ state, for the fourth subband/the $i^{th}$ subband, that corresponds to the third data packet may be referred to as a NACK.

Optionally, when the CBG HARQ-ACKs corresponding to the code block groups in the second CBG set are all DTX, the CBG HARQ-ACKs corresponding to the code block groups in the second CBG set are denoted as a NACK, and is used to determine a CWS of the fourth subband/the subband (in other words, the HARQ state, for the fourth subband/the $i^{th}$ subband, that corresponds to the third data packet is a NACK), or the CBG HARQ-ACKs corresponding to the second CBG set are ignored during adjustment of the CWS of the fourth subband/the $i^{th}$ subband.

It should be understood that the at least one CBG in the first CBG set may specifically correspond to the at least one CBG HARQ-ACK in the following several manners:

1. Each of the at least one CBG HARQ-ACK corresponds to one of the at least one CBG, or the at least one CBG HARQ-ACK one-to-one corresponds to the at least one CBG.

2. One of the at least one CBG HARQ-ACK corresponds to at least two of the at least one CBG.

3. One of the at least one CBG corresponds to at east two of the at least one CBG HARQ-ACK.

Similarly, the CBG HARQ-ACKs may one-to-one correspond to the CBGs in the second CBG set, or a plurality of CBG HARQ-ACKs corresponds to one CBG in the second CBG set, or one CBG HARQ-ACK corresponds to a plurality of CBGs in the second CBG set.

It should be understood that the first CBG set includes at least two CBGs, and the one or more HARQ-ACKs include at least two HARQ-ACKs, namely, at least two CBG-ACKs. This is a difference between this disclosure and the prior art, and is similar to that described in Embodiment 2. Details are not described again.

Similarly, the second CBG set includes at least two CBGs, and the HARQ-ACKs corresponding to the second CBG set include at least two HARQ-ACKs.

Figure 12:
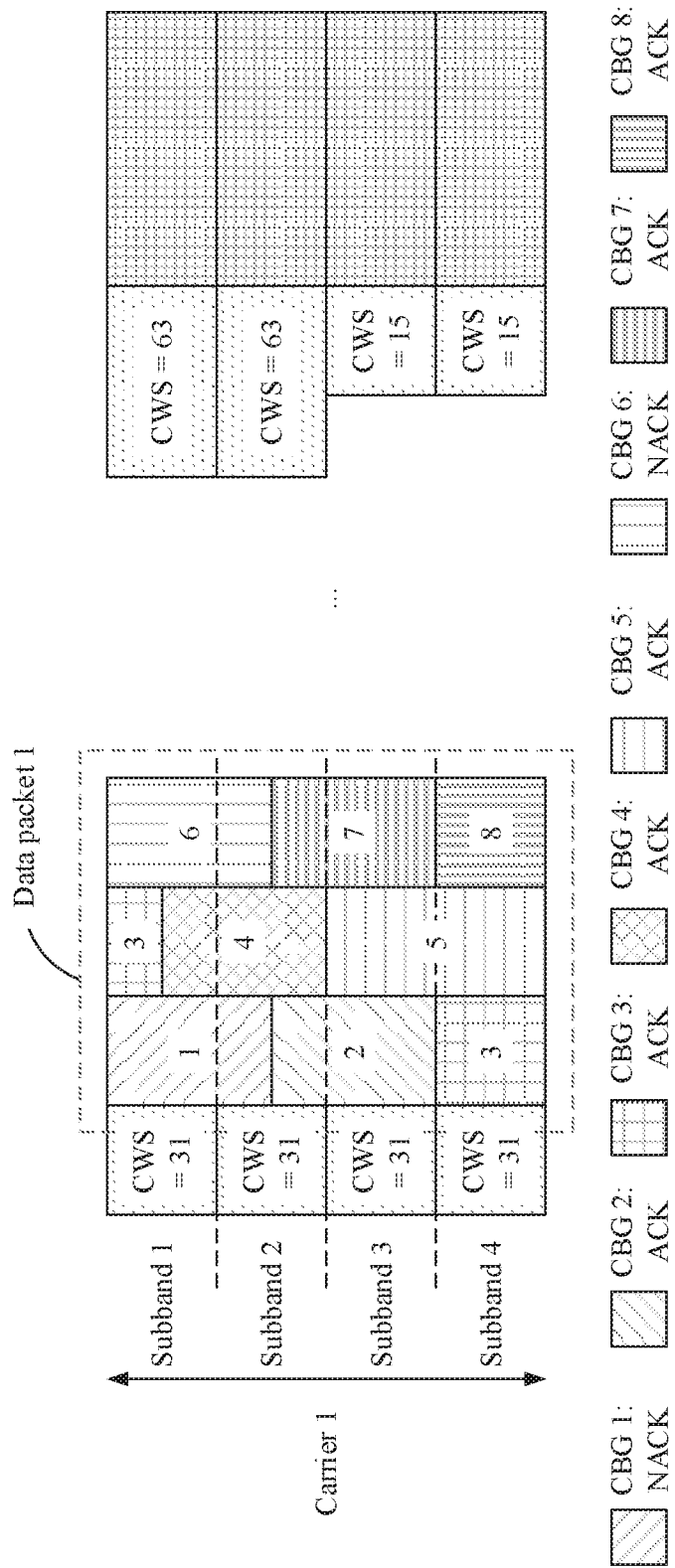
FIG. 12 is a schematic diagram of another CWS adjustment according to an embodiment of this disclosure.

For example, in FIG. 12, a downlink data packet 1 used by an access network device to schedule UE is carried on a subband 1 to a subband 4, and the subband 1 to the subband 4 do not carry another data packet. The data packet 1 includes a CBG 1 to a CBG 8, and the CBG 1 to the CBG 8 one-to-one correspond to eight HARQ-ACKs fed back by the second device. The CBG 1, the CBG 3, the CBG 4, and the CBG 6 occupy the subband 1, the CBG 1, the CBG 2, the CBG 4, the CBG 6, and the CBG 7 occupy the subband 2, the CBG 2, the CBG 5, and the CBG 7 occupy the subband 3, the CBG 3, the CBG 5, and the CBG 8 occupy the subband 4. CBG-ACKs corresponding to the CBG 1 and the CBG 6 are NACKs, and CBG-ACKs corresponding to other CBGs are ACKs. Because the subband 1 and the subband 2 each carry a CBG corresponding to a NACK, subband-ACKs (namely, a HARQ state, for the subband 1, that corresponds to the data packet 1, and a HARQ state, for the subband 2, that corresponds to the data packet 1), for the two subbands, that correspond to the data packet 1 and that are obtained through conversion are all NACKs. Therefore, CWs of the two subbands are each increased. Because CBGs carried on the subband #3 and the subband #4 all correspond to ACKs, subband-ACKs (namely, a HARQ state, for the subband 3, that corresponds to the data packet 1, and a HARQ state, for the subband 4, that corresponds to the data packet 1), for the two subbands, that correspond to the data packet 1 and that are obtained by conversion are all ACKs. Therefore, CWSs of the two subbands are each decreased.

In this embodiment of this disclosure, different subbands have different channel states. If a subband (for example, the first subband) has a relatively good channel state, a HARQ-ACK (CBG-ACK) corresponding to information (for example, a CBG that is in a data packet and that is carried on the subband) carried on the subband is an ACK. If a subband has a relatively poor channel state, a HARQ-ACK (CBG-ACK) corresponding to information carried on the subband is a NACK. If all CBGs included in the second data packet are converted into one HARQ state to adjust the CWS of the first subband, it is clearly that even if the first subband has a relatively good channel state and another subband has a relatively poor channel state, the HARQ state obtained through conversion is also limited by the subband that has a relatively poor channel state. For example, if the HARQ state is a NACK, the CWS of the first subband cannot be decreased benefiting from the subband that has a relatively good channel state, but is increased affecting by the subband that has a relatively poor channel state.

According to the method provided in this embodiment of this disclosure, CBG-ACKs that are in a data packet and that are distributed on each subband are converted into a HARQ state for the subband, to adjust a CWS of the subband. A CWS of a subband is affected by only a channel state of the subband, and is not affected by a channel state of another subband. Therefore, a CW of the subband can be more accurately determined, and channel access efficiency of the subband is improved.

Embodiment 5

It should be understood that, for Embodiment 1, Embodiment 3, and Embodiment 4, the one or more HARQ-ACKs corresponding to the first data packet are not only used to adjust CWs of the one or more subbands occupied by the first data packet, but also used to adjust a CWS of a subband (referred to as a fifth subband) that is not occupied by the first data packet.

In other words, the first device determines the contention window CWS of the fifth subband based on the one or more HARQ-ACKs, the fifth subband is not included in the one or more subbands, and the first device does not occupy the fifth subband to send information on the reference time unit.

In this embodiment, the one or more data packets include a fourth data packet, the fourth data packet is carried on the one or more subbands including the first subband, the fourth data packet does not occupy the fifth subband, and the one or more HARQ-ACKs include a HARQ-ACK corresponding to the fourth data packet. The first device determines the contention window size of the fifth subband based on the HARQ-ACK corresponding to the fourth data packet.

Optionally, the HARQ-ACK corresponding to the fourth data packet is a TB HARQ-ACK for a TB corresponding to the fourth data packet.

Optionally, the HARQ-ACK corresponding to the fourth data packet is at least one CBG HARQ-ACK corresponding to a CBG included in the fourth data packet.

Further, the first device does not occupy the fifth subband to send information on the reference time unit. For example, the first device is an access network device, the second device is a terminal device, and the first device is expected to occupy the fifth subband and the one or more subbands including the first subband to send a data packet (referred to as the fourth data packet) on the reference time unit. Alternatively, the first device is a terminal device, the second device is an access network device, and the second device schedules the first device to occupy the fifth subband and the one or more subbands including the first subband to send an original data packet on the reference time unit. Specifically, the original data packet is a complete data packet. Before sending the original data packet, the first device performs LBT on each subband. LBT on the one or more subbands including the first subband succeeds, but LBT on the fifth subband fails. Therefore, the first device can occupy only the one or more subbands including the first subband to send data information, and the data information is the fourth data packet and is a part of the original data packet. For example, the fourth data packet is obtained by puncturing data information that is in the original data packet and that is carried on the fifth subband. Although the first device does not occupy the fifth subband to send information on the reference time unit, for the fifth subband, a HARQ-ACK corresponding to the fourth data packet on the reference time unit may still be used to adjust the CWS of the fifth subband.

It should be understood that that the fifth subband is not included in the one or more subbands means that the fourth data packet is not carried on the fifth subband. In other words, the fourth data packet does not occupy any frequency domain resource of the fifth subband. In other words, the first device does not occupy the fifth subband to send information on the reference time unit. Specifically, the first device fails to perform LBT on the fifth subband before the reference time unit, and does not occupy the fifth subband to send information on the reference time unit.

Further, the fourth data packet is a part of the original data packet, and the original data packet is a data packet that is sent by the first device on the reference time unit based on first scheduling signaling by occupying the one or more subbands and the fifth subband. As described above, the data packet that is expected to be scheduled is the original data packet, and the original data packet is expected to occupy the one or more subbands and the fifth subband. However, the first device fails to perform LBT on the fifth subband before the reference time unit, and does not occupy the fifth subband. Therefore, the data information that is in the original data packet and that is carried on the fifth subband is punctured, and only data information that is in the original data packet and that is carried on the one or more subbands, namely, the fourth data packet, is sent. In this case, the fourth data packet is a partial data packet.

It should be understood that the fourth data packet may occupy only the one or more subbands and the fifth subband, or may occupy a subband other than the one or more subbands and the fifth subband. For example, the original data packet is expected to further occupy a subband other than the one or more subbands and the fifth subband.

However, because LBT on the another subband fails, the another subband is not occupied. This is similar to that the fifth subband is not occupied.

It should be understood that the first scheduling signaling is scheduling signaling for scheduling the original data packet. For example, the scheduling signaling is used to indicate scheduling information of the original data packet. The scheduling information includes at least one of information such as information about a time domain and/or frequency domain physical resource occupied by the original data packet, modulation and coding scheme information of the original data packet, reference signal information of a physical channel on which the original data packet is located, a HARQ process number of the original data packet, new data indicator (NDI) information of the original data packet, redundancy version (RV) information of the original data packet. For example, the first device is an access network device, and the second device is a terminal device. The scheduling signaling is downlink scheduling signaling sent by the first device, and the original data packet is a downlink data packet. For example, the first device is a terminal device, and the second device is an access network device. The scheduling signaling is uplink scheduling signaling sent by the access network device, and the original data packet is an uplink data packet. Alternatively, the scheduling signaling is scheduling signaling that is sent by the terminal device to indicate the scheduling information of the original data packet, and the original data packet is an uplink data packet.

In other words, the fourth data packet is a data packet sent by the first device based on first scheduling signaling, and the first scheduling signaling is further used to indicate the first device to occupy the fifth subband to send first data information. The scheduling signaling for scheduling the original data packet may also be referred to as scheduling signaling for scheduling the fourth data packet. In addition to scheduling the fourth data packet, the scheduling signaling further schedules the first device to occupy the fifth subband to send the first data information. The fourth data packet and the first data information are included in the original data packet.

It should be understood that, for the fifth subband, the reference time unit that corresponds to the fifth subband and that is determined by the first device is a reference time unit on which the fourth data packet is located (this is different from the prior art in which the reference time unit of the fifth subband is determined as a time unit on which the first device occupies the fifth subband to send information).

Specifically, the first device determines the contention window size of the fifth subband based on a HARQ state, for the fifth subband, that corresponds to a data packet in a fourth data packet set, and the fourth data packet set includes a data packet that is sent by the first device on the reference time unit without occupying the fifth subband. A method for determining the contention window size of the fifth subband is similar to that for determining, by the first device, the contention window size of the first subband based on the one or more HARQ-ACKs (for example, Embodiments 1 to 4), and a difference lies in that the first device does not occupy the fifth subband. For example, the HARQ state, for the fifth subband, that corresponds to the data packet in the fourth data packet set is represented by one or more HARQ-ACKs corresponding to the data packet in the fourth data packet set.

Further, an original data packet corresponding to each data packet in the fourth data packet set occupies the fifth subband. The original data packet is a data packet that the first device is scheduled to send on the reference time unit or a data packet that the first device schedules to send on the reference time unit.

Figure 13:
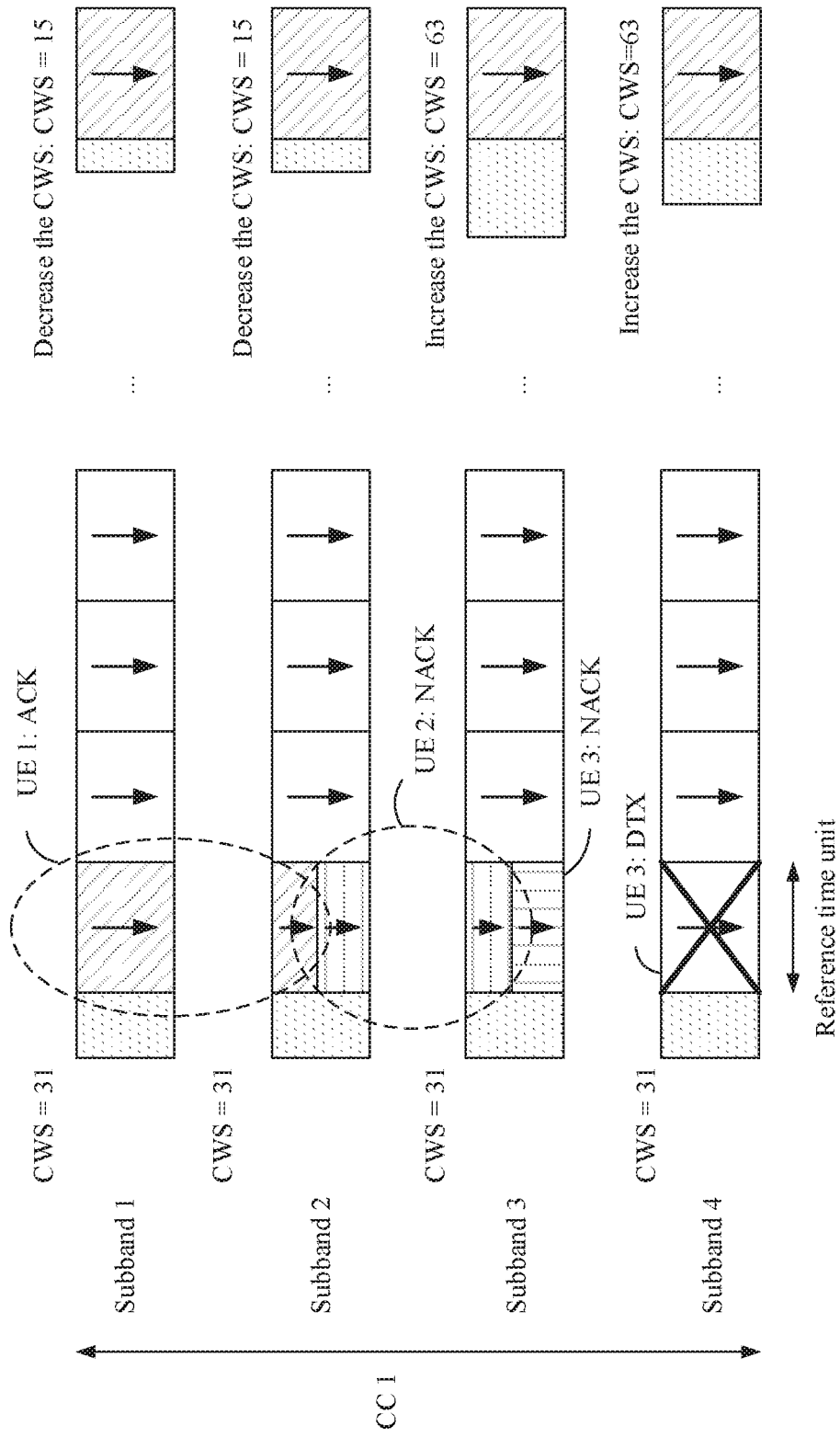
FIG. 13 is a schematic diagram of another CWS adjustment according to an embodiment of this disclosure.

For example, as shown in FIG. 13, an access network device is expected to occupy a subband 1 to a subband 4 to send information on the reference time unit. The access network device is expected to occupy the subband 1 and the subband 2 to send a data packet 1 to UE 1, is expected to occupy the subband 2 and the subband 3 to send a data packet 2 to UE 2, and is expected to occupy the subband 3 and the subband 4 to send a data packet 3 (an original data packet) to UE 3 and send scheduling signaling to indicate scheduling information of the data packet 3 to the UE 3. The access network device successfully performs LBT on the subband 1 to the subband 3, but fails to perform LBT on the subband 4. Therefore, the access network device occupies the subband 3 to send some data information (namely, the fourth data packet) of the data packet 3. A HARQ-ACK fed back by the UE 3 for the data packet 3 is a NACK, so that the access network device adjusts CWSs of the subband 3 and the subband 4 based on the NACK. For the subband 3, a proportion of accumulated NACKs is 100%. Therefore, the CWS of the subband 3 is increased. For the subband 4, the HARQ-ACK corresponding to the data packet 3 (or the fourth data packet) is a NACK. Therefore, the CWS of the subband 4 is increased.

Embodiment 6

The one or more data packets include a fifth data packet, the fifth data packet is carried on the first subband, and the fifth data packet does not occupy another subband. The one or more HARQ-ACKs include a TB HARQ-ACK for a transport block TB corresponding to the fifth data packet, and the TB HARQ-ACK is referred to as a TB HARQ-ACK corresponding to the fifth data packet.

In this case, the one or more HARQ states for the first subband that correspond to the one or more data packets include a HARQ state, for the first subband, that corresponds to the fifth data packet, and the HARQ state, for the first subband, that corresponds to the fifth data packet is used to determine the contention window of the first subband.

When the TB HARQ-ACK corresponding to the fifth data packet is an ACK, the HARQ state, for the first subband, that corresponds to the fifth data packet is an ACK; or when the TB HARQ-ACK corresponding to the fifth data packet is a NACK, the HARQ state, for the first subband, that corresponds to the fifth data packet is a NACK.

Further, when the TB HARQ-ACK corresponding to the fifth data packet is DTX, the TB HARQ-ACK corresponding to the fifth data packet is denoted as a NACK, and is used to determine the CWS of the first subband (in other words, the HARQ state, for the first subband, that corresponds to the fifth data packet is a NACK), or the TB HARQ-ACK corresponding to the fifth data packet is ignored during determining of the CWS of the first subband (in other words, the HARQ state, for the first subband, that corresponds to the fifth data packet is ignored during determining of the CWS of the first subband).

It should be understood that, in this embodiment of this disclosure, for a subband (for example, the first subband, the second subband, the third subband, the fourth subband, or the fifth subband), that the first device increases a CWS means that the first device doubles a CW, or the first device adjust the CWS to 2×p+1, where p (p is a positive integer) is a value of a CWS before adjustment, or the first device increases the CW to a next larger value in a CW set, where a CWS set of each priority is described in the background. Further, before the CWS is adjusted, if the CWS is a largest value in a CWS set, that the first device increases the CWS means that the first device keeps the CWS unchanged.

It should be understood that, in this embodiment of this disclosure, for a subband (for example, the first subband, the second subband, the third subband, the fourth subband, or the fifth subband), that the first device decreases a CWS means that the first device halves a CW, or the first device adjust the CWS to (p−1)/2, where p (p is a positive integer) is a value of a CW before adjustment, or the first device decreases the CW to a next smaller value in a CW set, where a CW set of each priority is described in the background. Further, before the CWS is adjusted, if the CW is a smallest value in a CW set, that the first device decreases the CWS means that the first device keeps the CWS unchanged.

In this embodiment of this disclosure, on one hand, when determining the reference time unit, the first device may determine a time unit occupied by the to-be-scheduled fourth data packet as the reference time unit, and an implementation algorithm is relatively simple. On the other hand, because the CWS of the fifth subband is probably increased, friendly coexistence with a surrounding node on the fifth subband can be implemented.

According to the method provided in this embodiment of this disclosure, a CWS of each subband may be specifically adjusted based on a HARQ-ACK (for example, a TB HARQ-ACK or a CBG HARQ-ACK) corresponding to a $c^{th}$ data packet (for example, the first data packet to the third data packet). The following uses two manners as examples to describe how the first device adjusts a CWS of a $j^{th}$ subband (for example, the first subband to the fifth subband) based on the HARQ-ACK.

In one manner, the first device adjusts the CWS of the $j^{th}$ subband based on a proportion of an ACK or a NACK to HARQ states corresponding to data packets (for example, all data packets carried on the $j^{th}$ subband) carried on the $j^{th}$ subband on the reference time unit. A HARQ state, for the $j^{th}$ subband, that corresponds to the $c^{th}$ data packet is represented by a HARQ-ACK corresponding to the $c^{th}$ data packet, as described above. In addition, the first device adds the HARQ state to a HARQ state set of the $j^{th}$ subband. For example, when the TB HARQ-ACK corresponding to the $c^{th}$ data packet is an ACK, the HARQ state, for the $j^{th}$ subband, that corresponds to the $c^{th}$ data packet is an ACK; or when the TB HARQ-ACK corresponding to the $c^{th}$ data packet is a NACK, the HARQ state, for the $j^{th}$ subband, that corresponds to the cm data packet is one NACK. Alternatively, when CBG HARQ-ACKs corresponding to the $c^{th}$ data packet are all ACKs, the HARQ state, for the subband, that corresponds to the $c^{th}$ data packet is an ACK; or when the CBG HARQ-ACKs corresponding to the $c^{th}$ data packet include at least one NACK, the HARQ state, for the $j^{th}$ subband, that corresponds to the $c^{th}$ data packet is a NACK. Alternatively, when CBG HARQ-ACKs corresponding to all CBGs that are in the $c^{th}$ data packet and that occupy the $j^{th}$ subband are ACKs, the HARQ state, for the $j^{th}$ subband, that corresponds to the $c^{th}$ data packet is an ACK; or when CBG HARQ-ACKs corresponding to all CBGs that are in the $c^{th}$ data packet and that occupy the $j^{th}$ subband include at least one NACK, the HARQ state, for the $j^{th}$ subband, that corresponds to the $c^{th}$ data packet is a NACK. Alternatively, when the HARQ-ACK corresponding to the $c^{th}$ data packet is DTX, the HARQ state, for the $j^{th}$ subband, that corresponds to the $c^{th}$ data packet is a NACK, or the HARQ state is ignored and is not added to the HARQ state set of the $j^{th}$ subband.

In addition, a conversion manner of a HARQ-ACK of another data packet carried on the $j^{th}$ subband on the reference time unit is similar to that of the HARQ-ACK of the $c^{th}$ data packet. For the $j^{th}$ subband, in the HARQ states corresponding to all the data packets carried on the $j^{th}$ subband, if a proportion of a NACK to the HARQ state set of the $j^{th}$ subband exceeds a preset proportion (for example, 80%), the first device increases the CWS. Otherwise, the first device decreases the CWS. Alternatively, if a proportion of an ACK to the HARQ state set of the $j^{th}$ subband does not exceed a preset proportion (for example, 20%), the first device increases the CWS. Otherwise, the first device decreases the CWS. The preset proportion may be a fixed threshold defined in a protocol or a regulation, or may be a threshold configured by an access network device.

In the other manner, the first device adjusts the CWS of the $j^{th}$ subband based on whether there is an ACK in HARQ states corresponding to data packets (for example, all data packets carried on the $j^{th}$ subband) carried on the $j^{th}$ subband on the reference time unit. For the $c^{th}$ data packet, the HARQ state, for the $j^{th}$ subband, that corresponds to the $c^{th}$ data packet is represented by a HARQ-ACK corresponding to the $c^{th}$ data packet. The specific conversion method is described in the foregoing manner. In addition, a conversion manner of a HARQ-ACK of another data packet carried on the $j^{th}$ subband on the reference time unit is similar to that of the HARQ-ACK of the $c^{th}$ data packet. For the $j^{th}$ subband, in the HARQ states corresponding to all the data packets carried on the $j^{th}$ subband on the reference time unit, if there is an ACK, the first device decreases the CWS; otherwise, the first device increases the CWS. Because the $c^{th}$ data packet occupies the $j^{th}$ subband, the HARQ state, for the $j^{th}$ subband, that corresponds to the $c^{th}$ data packet is also used to determine the CWS of the $j^{th}$ subband. Specifically, when the HARQ state, for the $j^{th}$ subband, that corresponds to the $c^{th}$ data packet is an ACK, the first device decreases the CWS. When the HARQ state, for the $j^{th}$ subband, that corresponds to the $c^{th}$ data packet is a NACK, and the HARQ state, for the $j^{th}$ subband, that corresponds to another data packet occupying the $j^{th}$ subband is also a NACK, the first device increases the CWS.

It should be understood that, in the foregoing two methods, the first device occupies two different subbands to send information on the reference time unit, for example, a $p^{th}$ subband and the $j^{th}$ subband, and p≠j. A quantity and a set of data packets carried on the $p^{th}$ subband each may be the same as or different from a quantity and a set of data packets carried on the $j^{th}$ subband, and p is a natural number. In other words, an element (a quantity of HARQ states and/or a data packet corresponding to the HARQ state) included in a HARQ state set of the $p^{th}$ subband may be the same as or different from an element (a quantity of HARQ states and/or a data packet corresponding to the HARQ state) included in the HARQ state set of the $j^{th}$ subband. For example, in a plurality of data packets sent by the first device on the reference time unit, a data packet 1, a data packet 2, and a data packet 3 occupy the $j^{th}$ subband, and the data packet 3 and a data packet 4 occupy the $p^{th}$ subband. In this case, a HARQ-ACK set of the jth subband includes three HARQ states corresponding to the data packet 1, the data packet 2, and the data packet 3, and a HARQ-ACK set of the pth subband includes two HARQ states corresponding to the data packet 3 and the data packet 4.

It should be understood that in an example of downlink transmission, the access network device schedules one or more terminal devices on the reference time unit, and sends one or more downlink data packets to each of the one or more terminal devices. Considering that the first device that adjusts the CWS is the access network device, all data packets carried on the $j^{th}$ subband include each downlink data packet that is sent by the access network device to each terminal device on the reference time unit by occupying the $j^{th}$ subband.

For example, during uplink transmission, the terminal device sends one or more uplink data packets on the reference time unit. Considering that the first device that adjusts the CWS is the terminal device, all data packets carried on the $j^{th}$ subband include each uplink data packet that is sent by the terminal device on the reference time unit by occupying the $j^{th}$ subband.

This disclosure provides a CWS determining method in an unlicensed spectrum. When a wideband data packet occupies a plurality of subbands, a sending node repeatedly uses a HAIR-ACK corresponding to the wideband data packet to adjust a CWS of each subband. In addition, when a receiving node feeds back a CBG-ACK, the sending node converts a plurality of CBG-ACKs for a subband that correspond to a same data packet into a TB-ACK, and then uses the TB-ACK to adjust a CWS of the subband. In this way, efficient access to a channel and friendly coexistence with surrounding contention nodes can be implemented, and notification signaling overheads are reduced.

The foregoing describes in detail the contention window size determining method according to the embodiments of this disclosure with reference to FIG. 1 to FIG. 13. The following describes a contention window size determining apparatus according to an embodiment of this disclosure with reference to FIG. 14. Technical features described in the method embodiments are also applicable to the following apparatus embodiment.

Figure 14:
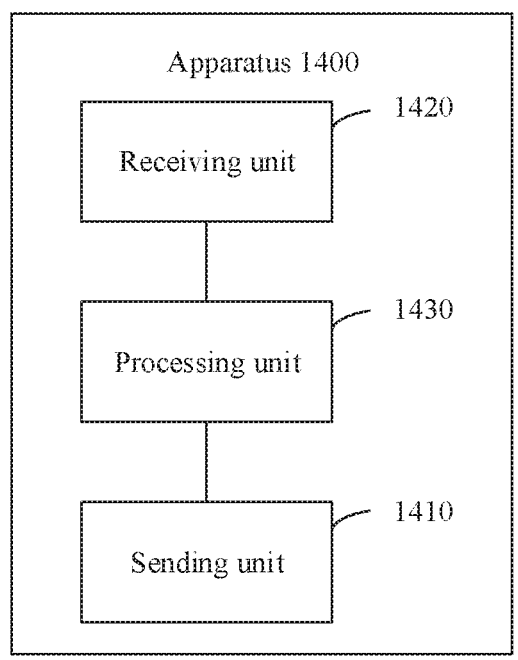
FIG. 14 is a schematic diagram of a CWS determining apparatus according to an embodiment of this disclosure.

FIG. 14 is a schematic block diagram of a contention window size determining apparatus 1400 according to an embodiment of this disclosure. As shown in FIG. 14, the apparatus 1400 includes:

a sending unit 1410, configured to send one or more data packets to one or more second devices on a reference time unit, where the one or more data packets occupy a first subband;

a receiving unit 1420, configured to receive one or more hybrid automatic repeat request HARQ-ACKs that are fed back by the one or more second devices and that correspond to the one or more data packets; and a processing unit 1430, configured to determine a contention window size of the first subband based on the one or more HARQ-ACKs.

Optionally, the processing unit is further configured to: determine the contention window size of the first subband based on one or more HARQ states for the first subband that correspond to the one or more data packets, where the contention window size of the first subband is determined based on one of the following information:

a proportion of a NACK in the one or more HARQ states for the first subband that correspond to the one or more data packets; or a proportion of an ACK in the one or more HARQ states for the first subband that correspond to the one or more data packets; or a quantity of NACKs in the one or more HARQ states for the first subband that correspond to the one or more data packets; or a quantity of ACKs in the one or more HARQ states for the first subband that correspond to the one or more data packets; or whether a HARQ state, for the first subband, that corresponds to the one data packet is a NACK; or whether a HARQ state, for the first subband, that corresponds to the one data packet is an ACK, where the one or more HARQ states for the first subband that correspond to the one or more data packets are represented by the one or more HARQ-ACKs.

It should be understood that the meaning of representing herein is described above, and details are not described herein again.

In a possible implementation, the one or more data packets include a first data packet, the first data packet is carried on a plurality of subbands including the first subband, and the one or more HARQ-ACKs include a TB HARQ-ACK for a transport block TB corresponding to the first data packet. When the TB HARQ-ACK is an ACK, a HARQ state, for the first subband, that corresponds to the first data packet is an ACK; or when the TB HARQ-ACK is a NACK, a HARQ state, for the first subband, that corresponds to the first data packet is a NACK.

Optionally, the plurality of subbands further include a second subband, and the processing unit is further configured to determine a contention window size of the second subband based on the TB HARQ-ACK.

Further, the one or more data packets include a second data packet, the second data packet includes one or more code block groups CBGs, and the one or more HARQ-ACKs include one or more CBG HARQ-ACKs corresponding to the one or more code block groups. When the one or more CBG HARQ-ACKs are all ACKs, a HARQ state, for the first subband, that corresponds to the second data packet is an ACK; or when the one or more CBG HARQ-ACKs include one or more NACKs, a HARQ state, for the first subband, that corresponds to the second data packet is a NACK.

In a possible implementation, the second data packet is carried on at least the first subband and a third subband, and the first device further determines a contention window size of the third subband based on the one or more CBG HARQ-ACKs.

Optionally, the one or more data packets include a third data packet, the third data packet is carried on a plurality of subbands including the first subband, the third data packet includes a first code block group set, the first code block group set is consisted of one or more code block groups that occupy the first subband, and the one or more HARQ-ACKs include one or more CBG HARQ-ACKs corresponding to the one or more code block groups in the first code block group set. When the one or more CBG HARQ-ACKs corresponding to the one or more code block groups in the first code block group set are all ACKs, a HARQ state, for the first subband, that corresponds to the third data packet is an ACK; or when the one or more CBG HARQ-ACKs corresponding to the one or more code block groups in the first code block group set include one or more NACKs, the HARQ state, for the first subband, that corresponds to the third data packet is a NACK.

Further, the first code block group set includes a first code block group, the first code block group occupies the first subband and a fourth subband, the third data packet further includes a second code block group set, the second code block group set is consisted of one or more code block groups that occupy the fourth subband, the second code block group set includes the first code block group, and the first device further determines a contention window size of the fourth subband based on a CBG HARQ-ACK corresponding to the first code block group.

The sending unit 1410 in the apparatus 1400 shown in FIG. 14 may correspond to a transmitter, the receiving unit 1420 in the apparatus 1400 shown in FIG. 14 may correspond to a receiver, and the processing unit 1430 in the apparatus 1400 shown in FIG. 14 may correspond to a processor. In another implementation, the transmitter and the receiver may be implemented by a same component, namely, a transceiver.

An example of this disclosure further provides an apparatus (for example, an integrated circuit, a wireless device, or a circuit module), configured to implement the foregoing method. An apparatus for implementing a power tracker and/or a power generator described in this specification may be an independent device or may be a part of a larger device. The device may be: (i) an independent IC, (ii) a set of one or more ICs, where the set may include a memory IC configured to store data and/or an instruction, (iii) an RFIC such as an RF receiver or an RF transmitter/receiver, (iv) an ASIC such as a mobile station modem, (v) a module that can be embedded in another device, (vi) a receiver, a cellular phone, a wireless device, a hand-held phone, or a mobile unit, or (vii) others.

The method and apparatus that are provided in the embodiments of this disclosure may be applied to the terminal device or the access network device (which may be collectively referred to as a wireless device). The terminal device, the access network device, or the wireless device may include a hardware layer, an operating system layer running on the hardware layer, and an disclosure layer running on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that process a service through a process. The disclosure layer includes disclosures such as a browser, an address book, word processing software, and instant messaging software. In addition, in the embodiments of this disclosure, a specific structure of an execution body of the method is not limited in the embodiments of this disclosure, provided that a program that records code of the method in the embodiments of this disclosure can be run to perform communication according to the signal transmission method in the embodiments of this disclosure. For example, the wireless communication method in the embodiments of this disclosure may be performed by the terminal device or the access network device, or may be performed by a function module that can invoke a program and execute the program in the terminal device or the access network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of the embodiments of this disclosure.

In addition, aspects or features in the embodiments of this disclosure may be implemented as a method, an apparatus, or a product that uses standard programming and/or engineering technologies. The term "product" used in this disclosure covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or carry an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this disclosure. The execution sequences of the processes should be determined based on functions and internal logic of the processes, and should not be construed as any limitation on the implementation processes of the embodiments of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software function unit and sold or used as an independent product, the functions may be stored in a computer readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure.

What is claimed is:

1. A method, comprising:
   sending, by a first device, a first data packet set and a second data packet set, wherein the first data packet set and the second data packet set comprise a first data packet that occupies at least a first subband and a second subband, and wherein the first data packet is a transport block (TB) or is obtained based on the TB;
   receiving, by the first device, a first hybrid automatic repeat request-acknowledgement (HARQ-ACK) corresponding to the first data packet, wherein the first HARQ-ACK is a TB HARQ-ACK for the TB corresponding to the first data packet; and
   determining, by the first device, a contention window size of each of the first subband and the second subband, wherein:
      the contention window size of the first subband is determined based on a first plurality of TB HARQ-ACKs for TBs corresponding to data packets in the first data packet set, the first plurality of TB HARQ-ACKs comprise the first HARQ-ACK corresponding to the first data packet that occupies at least the first subband and the second subband, and
      the contention window size of the second subband is determined based on a second plurality of TB HARQ-ACKs for TBs corresponding to data packets in the second data packet set, the second plurality of TB HARQ-ACKs comprise the first HARQ-ACK corresponding to the first data packet that occupies at least the first subband and the second subband.

2. The method according to claim 1, wherein the contention window size of the first subband is determined by:
   a proportion of an ACK in the TB HARQ-ACKs for TBs corresponding to data packets in the first data packet set; or
   a quantity of ACKs in the TB HARQ-ACKs for TBs corresponding to data packets in the first data packet set.

3. The method according to claim 1, wherein the first subband and the second subband are comprised in a same carrier.

4. The method according to claim 1, wherein each data packet in the first data packet set occupies at least the first subband, and each data packet in the second data packet set occupies at least the second subband.

5. An apparatus, comprising:
   at least one processor; and
   a memory coupled to the at least one processor and storing programming instructions for execution by the at least one processor to:
   send a first data packet set and a second data packet set, wherein the first data packet set and the second data packet set comprise a first data packet that occupies at least a first subband and a second subband, and wherein the first data packet is a transport block (TB) or is obtained based on the TB;
   receive a first hybrid automatic repeat request-acknowledgement (HARQ-ACK) corresponding to the first data packet, wherein the first HARQ-ACK is a TB HARQ-ACK for the TB corresponding to the first data packet; and
   determine a contention window size of each of the first subband and the second subband, wherein:
      the contention window size of the first subband is determined based on a first plurality of TB HARQ-ACKs for TBs corresponding to data packets in the first data packet set, the first plurality of TB HARQ-ACKs comprise the first HARQ-ACK corresponding to the first data packet that occupies at least the first subband and the second subband, and
      the contention window size of the second subband is determined based on a second plurality of TB HARQ-ACKs for TBs corresponding to data packets in the second data packet set, the second plurality of TB HARQ-ACKs comprise the first HARQ-ACK corresponding to the first data packet that occupies at least the first subband and the second subband.

6. The apparatus according to claim 5, wherein the contention window size of the first subband is determined by:
   a proportion of an ACK in the TB HARQ-ACKs for TBs corresponding to data packets in the first data packet set; or
   a quantity of ACKs in the TB HARQ-ACKs for TBs corresponding to data packets in the first data packet set.

7. The apparatus according to claim 5, wherein the first subband and the second subband are comprised in a same carrier.

8. The apparatus according to claim 5, wherein each data packet in the first data packet set occupies at least the first subband, and each data packet in the second data packet set occupies at least the second subband.

9. A method, comprising:
   receiving, by a second device, a first data packet set and a second data packet set, wherein the first data packet set and the second data packet set comprise a first data packet that occupies at least a first subband and a second subband, and wherein the first data packet is a transport block (TB) or is obtained based on the TB; and sending, by the second device, a first hybrid automatic repeat request-acknowledgement (HARQ-ACK) corresponding to the first data packet, wherein the first HARQ-ACK is a TB HARQ-ACK for the TB corresponding to the first data packet, and wherein a contention window size of the first subband is determined based on a first plurality of TB HARQ-ACKs for TBs corresponding to data packets in the first data packet set, the first plurality of TB HARQ-ACKs comprise the first HARQ-ACK corresponding to the first data packet that occupies at least the first subband and the second subband, and wherein a contention window size of the second subband is determined based on a second plurality of TB HARQ-ACKs for TBs corresponding to data packets in the second data packet set, the second plurality of TB HARQ-ACKs comprise the first HARQ-ACK corresponding to the first data packet that occupies at least the first subband and the second subband.

10. The method according to claim 9, wherein the contention window size of the first subband is determined by:
a proportion of an ACK in the TB HARQ-ACKs for TBs corresponding to data packets in the first data packet set; or
a quantity of ACKs in the TB HARQ-ACKs for TBs corresponding to data packets in the first data packet set.

11. The method according to claim 9, wherein the first subband and the second subband are comprised in a same carrier.

12. The method according to claim 9, wherein each data packet in the first data packet set occupies at least the first subband, and each data packet in the second data packet set occupies at least the second subband.

13. An apparatus, comprising:
at least one processor; and
a memory coupled to the at least one processor and storing programming instructions for execution by the at least one processor to:

receive a first data packet set and a second data packet set, wherein the first data packet set and the second data packet set comprise a first data packet that occupies at least a first subband and a second subband, and wherein the first data packet is a transport block (TB) or is obtained based on the TB; and send a first hybrid automatic repeat request-acknowledgement (HARQ-ACK) corresponding to the first data packet, wherein the first HARQ-ACK is a TB HARQ-ACK for the TB corresponding to the first data packet, and wherein a contention window size of the first subband is determined based on a first plurality of TB HARQ-ACKs for TBs corresponding to data packets in the first data packet set, the first plurality of TB HARQ-ACKs comprise the first HARQ-ACK corresponding to the first data packet that occupies at least the first subband and the second subband, and wherein a contention window size of the second subband is determined based on a second plurality of TB HARQ-ACKs for TBs corresponding to data packets in the second data packet set, the second plurality of TB HARQ-ACKs comprise the first HARQ-ACK corresponding to the first data packet that occupies at least the first subband and the second subband.

14. The apparatus according to claim 13, wherein the contention window size of the first subband is determined by:
a proportion of an ACK in the TB HARQ-ACKs for TBs corresponding to data packets in the first data packet set; or
a quantity of ACKs in the TB HARQ-ACKs for TBs corresponding to data packets in the first data packet set.

15. The apparatus according to claim 13, wherein the first subband and the second subband are comprised in a same carrier.

16. The apparatus according to claim 13, wherein each data packet in the first data packet set occupies at least the first subband, and each data packet in the second data packet set occupies at least the second subband.

* * * * *